(12) United States Patent
Lu et al.

(10) Patent No.: US 8,789,166 B2
(45) Date of Patent: *Jul. 22, 2014

(54) VERIFICATION METHOD AND SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 110 days.

This patent is subject to a terminal disclaimer.

(21) Appl. No.: 13/502,772

(22) PCT Filed: Oct. 29, 2010

(86) PCT No.: PCT/CN2010/078238
§ 371 (c)(1),
(2), (4) Date: Apr. 19, 2012

(87) PCT Pub. No.: WO2011/050745
PCT Pub. Date: May 5, 2011

(65) Prior Publication Data
US 2012/0210408 A1    Aug. 16, 2012

(30) Foreign Application Priority Data

| Oct. 30, 2009 | (CN) | 2009 1 0235952 |
| Dec. 31, 2009 | (CN) | 2009 1 0244640 |
| Jan. 13, 2010 | (CN) | 2010 1 0034156 |
| Jan. 13, 2010 | (CN) | 2010 1 0034164 |

(51) Int. Cl.
G06F 7/04 (2006.01)
H04L 29/06 (2006.01)
H04L 9/16 (2006.01)
H04L 9/32 (2006.01)

(52) U.S. Cl.
CPC .............. *H04L 9/16* (2013.01); *H04L 63/1483* (2013.01); *H04L 9/3226* (2013.01); *H04L 2209/56* (2013.01); *H04L 63/0846* (2013.01)
USPC .......................................................... 726/18

(58) Field of Classification Search
CPC ........ H04L 9/3226; G06F 21/31; G06F 21/46
See application file for complete search history.

(56) References Cited

U.S. PATENT DOCUMENTS

| 6,904,526 | B1 * | 6/2005 | Hongwei | 713/182 |
| 2009/0037988 | A1 | 2/2009 | Yang et al. | |
| 2009/0185687 | A1 | 7/2009 | Wankmueller et al. | |
| 2013/0312075 | A1 * | 11/2013 | Nichols et al. | 726/8 |

FOREIGN PATENT DOCUMENTS

| CN | 101174953 A | 5/2008 |
| CN | 101453458 | 6/2009 |

(Continued)

*Primary Examiner* — Pramila Parthasarathy
(74) *Attorney, Agent, or Firm* — Fay Sharpe LLP

(57) ABSTRACT

The invention discloses an authenticating method and a system thereof, which relates to information security field and solves the problem that the user information is not safe in transaction process. The embodiment of the invention comprises that the server side receives user data information and a first dynamic password sent from the user side; the server side generates the first authenticating dynamic password according to the user data information; server side verifies the first dynamic password according to the first authenticating dynamic password and generates the second authenticating dynamic password after successful verification; the server side sends the second authenticating dynamic or the first password to the user side; the server side executes the transaction data in the user data information or permits the user to log on after using a third authenticating dynamic password generated by the server side to verify the user data information or the third dynamic password sent from the user side successfully. The invention enhances the safety of transaction for the user and prevents the user from loss caused by logging on phishing website by the user.

16 Claims, 16 Drawing Sheets

(56) References Cited

FOREIGN PATENT DOCUMENTS

| CN | 101459513 A | 6/2009 |
| CN | 101699820 | 4/2010 |
| CN | 101741567 | 6/2010 |
| CN | 101777983 | 7/2010 |
| CN | 101777984 | 7/2010 |

\* cited by examiner

US 8,789,166 B2

VERIFICATION METHOD AND SYSTEM THEREOF

FIELD OF THE INVENTION

The invention relates to information security technology field, and more particularly relates to a verification method and a system thereof.

BACKGROUND OF THE INVENTION

With network technology is applied much more widely in people's daily life, people rely more on network to take part in more daily activities such as shopping, office work and entertainment via network. Due to the wide use of network applications, all kinds of websites which provide convenient services appear with increasing numbers and the security level required by the network is higher as well, especially the websites concerned e-bank and government office work which require the user who logs on to be legitimate. In recent years, dynamic password method is used widely to carry on verification in verification field. Dynamic password is added on the basis of the static password authentication in this verification method, which provides additional protection for a user password and enhances the security.

In the prior art, the authentication for the dynamic password is performed in the following way. The service provider distributes a dynamic password token to a user. With the same size as a USB drive, the token is an electronic device with processor and can run itself independently when the token is loaded with cells or is powered. Generally, a seed, which is called as static factor, corresponding to the dynamic password token, is stored inside the dynamic password token safely. The seed is a long character string or data. The dynamic password token can generate a dynamic password according to the dynamic password algorithm built in the token by using the seed and a dynamic factor. Because the dynamic factor can be a time factor or an event factor, the passwords generated are different from time to time, which provides higher security.

In the process of authenticating the above dynamic password, the inventor found that following problem lies in the prior art: the dynamic password with higher security is difficult to be cracked, but the method of verifying the dynamic password can not prevent an attack from a phishing website and the dynamic password has the possibility of being stolen. If a user opens and logs on a phishing website which masquerades as a real website, the phishing website will record the logon information input by the user. And the phishing website will pose as the user to log on the real website by using the recorded information, which will bring a big loss to the user information and property.

SUMMARY OF THE INVENTION

The invention provides a verification method and system thereof, which enhances security when a user executes transaction.

For the purpose above, the invention adapts following technical solution.

The invention provides a verification method, which comprises receiving, by a server side, user data information and a first dynamic password sent by a user side;

generating, by the server side, a first authenticating dynamic password according to the user data information;

verifying, by the server side, the first dynamic password according to the first authenticating dynamic password and generating a second authenticating dynamic password after the first authenticating dynamic password passes verification;

sending, by the server side, the second authenticating dynamic password or a first password to the user side, wherein the first password is obtained by that the server side splitting the second authenticating dynamic password into the first password and a second password according to a predetermined rule, for sending, by the server side, the second authenticating dynamic password to the user side, if receiving, by the server side, a third dynamic password from the user side in a predetermined time, verifying a third dynamic password; the user side is legitimate if the third dynamic password passes verification;

or decrypting, by the server side, received cipher information from the user side to obtain plain information, and determining whether the plain information is in accordance with transaction information which is included in the user data information, wherein if yes, executing transaction, and the cipher information is obtained by encrypting the transaction information with the third dynamic password after the received second authenticating dynamic password passes verification;

for sending, by the server side, the first password to the user side, receiving, by the server side, a second dynamic password returned from the user side in a predetermined time, and verifying the second dynamic password by using the second password, wherein the user is legitimate if the second dynamic password passes verification; or decrypting, by the server side, the cipher information from the user side by using the second password to obtain plain information, and determining whether the plain information is in accordance with the transaction information which is included in the user data information, wherein if yes, executing transaction, and the cipher information is obtained by encrypting the transaction information with a third password, and wherein after the user side receives the confirmation information that the user confirms that the first password is in accordance with corresponding data in the second dynamic password generated by the user side, the user side uses the rest part of the data in the second dynamic password as the third password.

The invention further provides a verification system, which comprises a server side and a user side, in which the server side comprises:

a receiving module configured for receiving user data information and a first dynamic password from the user side;

a generating module or a generating and splitting module, in which the generating module is configured for generating a second authenticating dynamic password after the server side verifies that the first dynamic password is correct by using a first authenticating dynamic password, and is further configured for generating a third authenticating dynamic password; the generating and splitting module is configured for generating a second authenticating dynamic password after the server side verifies that the first dynamic password is correct by using a first authenticating dynamic password and splitting the second authenticating dynamic password into a first password and a second password according to a predetermined rule;

a sending module configured for sending the second authenticating dynamic password or a first password to the user side; wherein if the sending module is configured for sending the second authenticating dynamic password to the user side, the receiving module is further configured for receiving a third password from the user side and the server side further comprises a verifying module configured for verifying the third password received by the receiving module from the user side, wherein if the verification is successful, the user side is legitimate; or the receiving module is further configured for receiving encrypted cipher information from the user side, and the server side further comprises a decrypting module configured for decrypting the encrypted cipher information received from the user side to obtain plain information; a determining module configured for determining whether the plain information is in accordance with the transaction information; and an executing module configured for executing transaction after determining that the plain information is in accordance with the transaction information by the determining module;

if the sending module is configured for sending the first password to the user side, the receiving module is further configured for receiving a second dynamic password returned by the user side, and the server side further comprises a verifying module for verifying the second dynamic password by using the second password, wherein if the verification is successful, the user is determined to be legitimate, or the receiving module is further configured for receiving cipher information from a user side, and the server side further comprises a decrypting module configured for decrypting encrypted cipher information received by the receiving module from the user side, in which the cipher information is obtained by encrypting the transaction information by the user side with a third password which is the rest part data of the second dynamic password after receiving a confirming information that the user determines that the first password is in accordance with a corresponding part data of the second dynamic password by comparison; a determining module configured for determining whether the plain information is in accordance with the transaction information; and an executing module configured for executing transaction after the determining module determines that the plain information is in accordance with the transaction information.

Therefore, the verification method and the system thereof provided by the invention can confirm the legitimate identity of the two parties of the transaction, enhance the security of transaction made by the user and prevent the user from loss caused by logging on a phishing website by the user.

DETAILED DESCRIPTION OF THE PREFERRED EMBODIMENTS OF THE INVENTION

Objects, technical solutions, and advantages of the invention will be easily understood by reference to the following description of embodiments of the invention when read in conjunction with the accompanying drawings.

Embodiment 1

Figure 1:
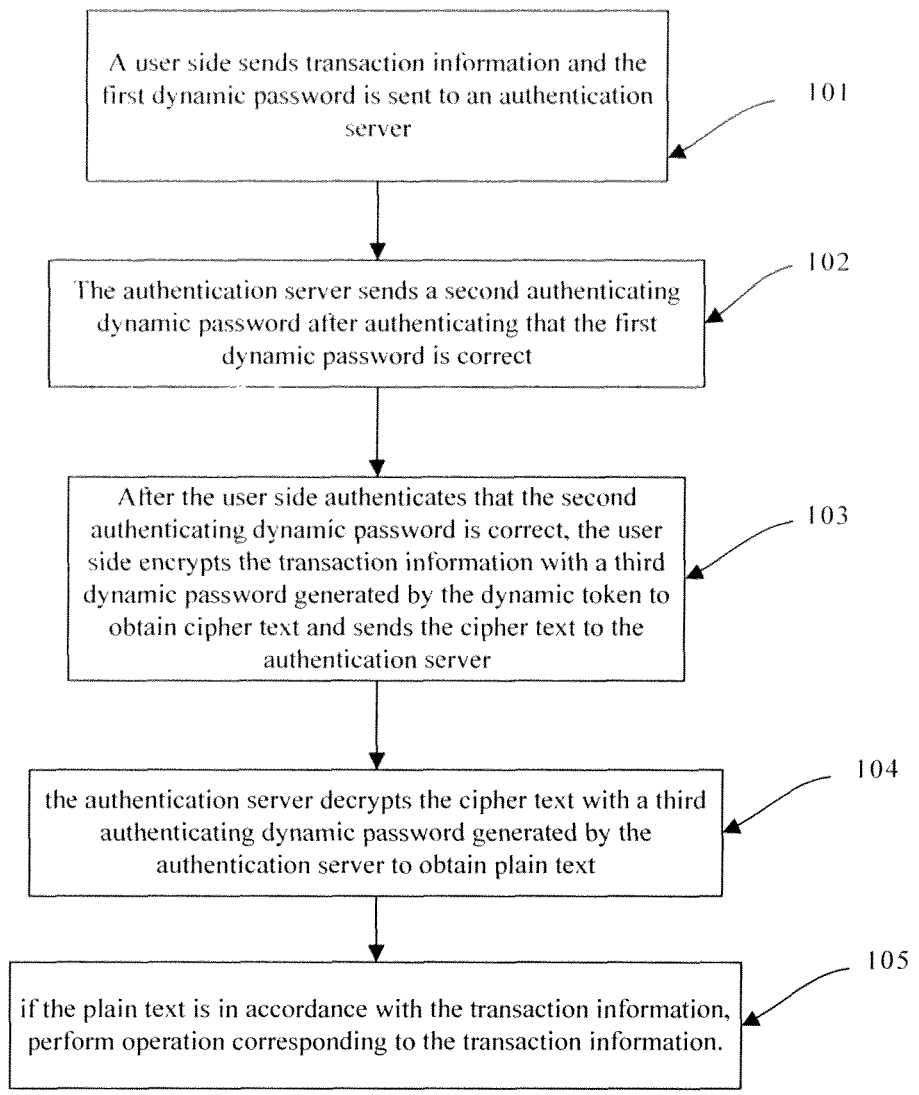
FIG. 1 is a flow chart illustrating a transaction signature method provided by Embodiment 1 of the invention.

The embodiment of the invention provides a transaction signature method. In the embodiment of the invention, an authentication server is set with a dynamic password generating algorithm and a seed which are same to a dynamic password generating algorithm and a seed set in a dynamic password token so as to enable that the authentication server and the dynamic password token can authenticate with each other. As shown in FIG. 1, the method comprises:

101, when a user needs transaction, the user uses the dynamic password token to generate a first dynamic password at first, transaction information and the first dynamic password is sent to an authentication server via a user side;

102, Upon receiving the transaction information and the first dynamic password, the authentication server authenticates the received first dynamic password; if the first dynamic password is correct, the authentication server generates a second authenticating dynamic password and sends information-to-be-authenticated in which the second authenticating dynamic password generated by the authentication server is included to the user side;

103, Upon receiving the information-to-be-authenticated in which the second authenticating dynamic password is included, the user can verify the information, and if information-to-be-authenticated in which the second authenticating dynamic password is included is correct, the user side encrypts the transaction information with a third dynamic password generated by the dynamic token to obtain cipher text and sends the cipher text to the authentication server;

104, the authentication server decrypts the cipher text with a third authenticating dynamic password generated by the authentication server to obtain plain text;

105, if the plain text is in accordance with the transaction information, perform operation corresponding to the transaction information.

Correspondingly, before authenticating the first dynamic password from the user side, the number of the dynamic password token which generates the first dynamic password at the user side can be found according to the user account information in the transaction information, and a corresponding seed and a corresponding dynamic factor can be found according to the number so as to verify the first dynamic password by an authenticating dynamic password generated based on the corresponding seed and corresponding dynamic factor.

Correspondingly, after the second authenticating dynamic password is sent to the above user, the user verifies the received second authenticating dynamic password. After the user verifies that the second authenticating dynamic password is correct, the user side described above sends cipher text generated by encrypting the transaction information with the third dynamic password to an entity, such as the authentication server, which generates the second authenticating dynamic password.

Correspondingly, the above mentioned generating the second authenticating dynamic password includes updating a dynamic factor and generating the above second authenticating password by using the updated dynamic factor.

The above mentioned generating the second authenticating dynamic password can include generating the second authenticating dynamic password based on time or event.

While generating the second authenticating dynamic password based on event, updating the dynamic factor described above includes the dynamic factor to be a first dynamic factor used by the dynamic password token to generate the first dynamic password, in which the first dynamic factor is counting value for generating the first dynamic password by the dynamic password token; the dynamic factor is added by a predetermined step size so as to be the updated dynamic factor.

While generating the second authenticating dynamic password based on time, updating the dynamic factor described above includes setting the dynamic factor described above as a first dynamic factor used by the dynamic password token to generate the first dynamic password, in which the first dynamic factor is a difference between the counting time of generating the first dynamic password and a preset initial time of the dynamic password token; updating a counting time offset according to the dynamic factor, which the counting time offset is a difference between the current counting time of an entity which generates the second authenticating dynamic password and the current counting time of the dynamic password token; the updated dynamic factor is generated according to the counting time offset, the counting time for generating the second authenticating dynamic password by the entity and the preset initial time of the above entity.

Preferably, the updated dynamic factor=the counting time for generating second authenticating dynamic password by the above entity−the initial time of the above entity−the counting time offset.

While generating the second authenticating dynamic password based on time, generating the second authenticating dynamic password and sending the above second authenticating dynamic password to the above user side includes generating a dynamic password at regular time intervals and sending the above dynamic password as the above second authenticating password to the above user side such that the user verifies the currently sent second authenticating dynamic password.

Verifying the above first dynamic password can include generating the first authenticating dynamic password; determining whether the first dynamic password is identical to the above first authenticating dynamic password, if yes, the above first dynamic password is correct;

Or authenticating the above first dynamic password can include generating a set of authenticating dynamic passwords; determining whether an authenticating dynamic password which is identical to the above first dynamic password is existed in the above first set of authenticating dynamic passwords, if yes, the above first dynamic password is correct.

The above algorithm of generating the above first authenticating dynamic password and the algorithm of generating the above first dynamic password are identical; the algorithm of generating an authenticating dynamic password in the above first set of authenticating dynamic passwords and the algorithm of generating a first dynamic password are identical.

Verifying the above third dynamic password includes generating a third authenticating dynamic password; determining whether the above third authenticating dynamic password is identical to the above third dynamic password, if yes, the above third dynamic password is correct;

Or, authenticating the above third dynamic password may include generating a third set of dynamic passwords, determining whether an authenticating dynamic password which is identical to the above third dynamic password is existed in the above third set of authenticating dynamic passwords, if yes, the above third dynamic password is correct.

The algorithm of generating the above third authenticating dynamic password and the algorithm of generating the above third dynamic password are identical; the algorithm of generating any authenticating dynamic password in the above third set of authenticating dynamic passwords and the algorithm of generating the above third dynamic password are identical.

When the second authenticating dynamic password is generated based on time, the above second authenticating dynamic password and the first authenticating dynamic password are not identical. Thereby the following way can be realized: adding a preset step size on the updated dynamic factor; generating the second authenticating password according to the dynamic factor with the preset step size added.

Similarly, when the second authenticating dynamic password is generated based on time, the above third authenticating dynamic password is different from the second authenticating dynamic password. Thereby the following way can be realized: when the third authenticating dynamic password is generated, the dynamic factor is updated at first. Thereby, updating the dynamic factor can be realized by the above method for updating the dynamic factor after generating the first authenticating dynamic password; Then adding a preset step size to the updated dynamic factor and then generating the third authenticating dynamic password by using the updated dynamic factor with the preset step size added.

Figure 2:
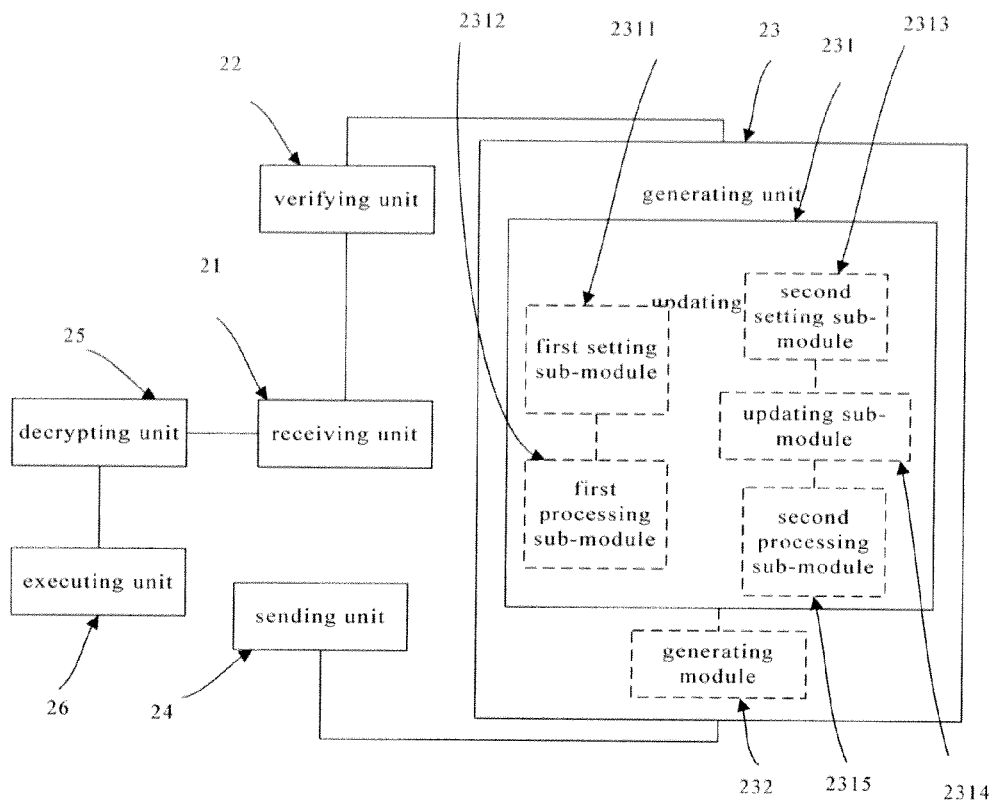
FIG. 2 is a block diagram illustrating an authentication server provided by Embodiment 1 of the invention.
Figure 3:
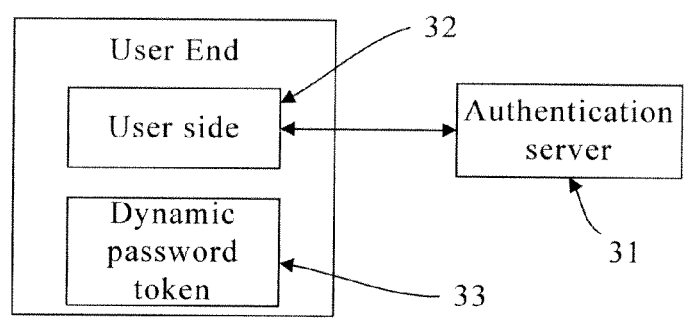
FIG. 3 is a diagram illustrating principle of a transaction signature system provided by Embodiment 1 of the invention.

The embodiment of the invention further provides an authentication server. The authentication server and the dynamic password token are set with an identical dynamic password generating algorithm and an identical seed. In the embodiment of the invention, the authentication server and the dynamic password token can generate dynamic password based on time or event. Referring to FIG. 2, the authentication server comprises a receiving unit 21, a verifying unit 22, a generating unit 23, a sending unit 24 and a decrypting unit 25 and an executing unit 26.

The receiving unit 21 is for receiving transaction information and a first dynamic password sent by a user side and the first dynamic password is generated by the dynamic token; the verifying unit 22 is for verifying the first dynamic password; the generating unit 23 is for generating the second authenticating dynamic password after the first dynamic password is verified successfully; the sending unit 24 is for sending the second authenticating dynamic password to the user side; the receiving unit 21 is further for encrypting the transaction information with the third dynamic password generated by the dynamic password token to get cipher text after the user side verifies the second authenticating dynamic password is correct; the decrypting unit 25 is for decrypting the cipher text with the third authenticating dynamic password generated by the decrypting unit 25 to get plain text; the executing unit 26 is for executing operation corresponding to the transaction information when the transaction information is in accordance with the plain text.

Specifically, referring to the dotted line in FIG. 2, the realization way of generating module 23 in the embodiment of the invention includes an updating unit 231 and a generating module 232. The updating unit 231 is for updating dynamic factor; the generating module 232 is for generating the second authenticating dynamic password by using the updated dynamic factor.

When the second authenticating dynamic password is generated based on event, the updating module 231 can use, but not limited to, the following way of realization:

The updating module 231 includes a first setting sub-module 2311 and a first processing sub-module 2312; wherein, the first setting sub-module 2311 is for setting the dynamic factor to be the first dynamic factor used by the user side for generating the first dynamic password, the first dynamic factor is a counting value when the user side generates the first dynamic password; the first processing sub-module 2312 is for adding a preset step size to the dynamic factor so as to be used as the updated dynamic factor.

When the second authenticating dynamic password is generated based on time, the updating module 231 can use, but not limited to, the following way of realization:

the updating module 231 includes a second setting sub-module 2313, an updating sub-module 2314 and a second processing sub-module 2315; wherein, the second setting sub-module 2313 is for setting the dynamic factor to be the first dynamic factor used by the user side for generating the first dynamic password, the first dynamic factor is a difference between the counting time when the first dynamic password is generated by the user side and the preset initial time of the user side; the updating sub-module 2314 is for updating counting time offset according to the dynamic factor, the counting time offset is a difference between the current counting time of the authentication server and the current counting time of the user side; the second processing sub-module 2315 is for generating the updated dynamic factor according to the counting time offset, the counting time at the time of the authentication server generating the second authenticating dynamic password and the preset initial time of the authentication server.

When the second authenticating dynamic password is generated based on time and in order to avoid the verification failure caused by asynchronous, the cooperation of the generating unit 23 and the sending unit 24 in the embodiment of the invention can be realized by, but not limited to, the following two ways:

The first way is that the generating unit 23 generates a dynamic password at regular time intervals. The sending unit 24 sends the generated dynamic password as the second authenticating dynamic password to the user side so as to make the second authenticating dynamic password to be verified;

The second way is that the generating unit 23 generates a set of dynamic passwords as the second authenticating dynamic password, the sending unit 24 sends the set of generated dynamic passwords to the user side so as to make the second authenticating dynamic password which is being sent to be verified.

In the embodiment of the invention, verifying the first dynamic password can use, but not limited to, the following two solutions:

The first solution is that the generating unit 23 is for generating a first authenticating dynamic password; the authenticating unit 22 is for determining whether the first dynamic password is identical to the first authenticating dynamic password, if yes, the first dynamic password is correct;

The second solution is that the generating unit 23 is for generating a first set of authenticating dynamic passwords; the authenticating unit 22 is for determining whether an authenticating dynamic password of the first set of authenticating dynamic passwords is identical to the first dynamic password, if yes, the first dynamic password is correct.

The embodiment of the invention provides a transaction signature system, which includes an authentication server 31, a user side 32, a dynamic password token 33; the authentication server 31 establishes a communication link with the user side; neither the user side nor the authentication server is communicated with the dynamic password token. But the authentication server and the dynamic password token are set with an identical dynamic password generating algorithm and an identical seed. In addition, both the authentication server and the dynamic password token can generate a dynamic password based on time or event.

Before doing transaction, a user uses the dynamic password token 33 to generate a first dynamic password at first; transaction information and the first dynamic password is sent to the authentication server 31 via the user side 32; the authentication server 31 is for receiving the transaction information and the first dynamic password sent from the user side; After the first dynamic password is verified to be correct, a second authenticating dynamic password generated by the authentication server 31 is sent to the user side 32;

The user side 32 is for encrypting the transaction information with a third dynamic password generated by the dynamic password token 33 to get the cipher text and sending the cipher text to the authentication server 31; specifically, when the second authenticating dynamic password is verified, the user requires the dynamic password token to generate a second dynamic password; the user side compares the received second authenticating dynamic password with the second dynamic password generated by the dynamic password token; if they are identical, the verification is success, otherwise, the verification is failure.

The authentication server 31 is further for decrypting the cipher text with the third authenticating dynamic password generated by the authentication server to get plain text; if the plain text is in accordance with the transaction information, performing operation corresponding to the transaction information.

In order to make the user check the input transaction information, the information-to-be-checked sent to the user side by the authentication server further includes the transaction information in the embodiment of the invention.

The two method described above in FIG. 2 can be used by authentication server of the transaction signature system in the embodiment of the invention for verifying the first dynamic password.

By the transaction signature method, the authentication server and the system thereof, of the dynamic password provided by the embodiment of the invention, the transaction information and the first dynamic password is needed at the time of transaction, the first dynamic password is verified by the authentication server, and the authentication server is not required to send the second authenticating dynamic password for the user side to verify such that authentication server and the user side can verify the legitimate identity with each other. After successful verification of identity of both sides, the user side sends the transaction information, which is encrypted, to the authentication server again and the corresponding transaction is executed when the transaction information sent two times is same.

Therefore, the transaction signature method, the authentication server and the system thereof provided by the embodiment of the invention can confirm the legitimate identities of two transaction parties and improve the security for the user to do transaction and avoid loss caused by logging on a phishing website by the user.

Embodiment 2

Figure 4:
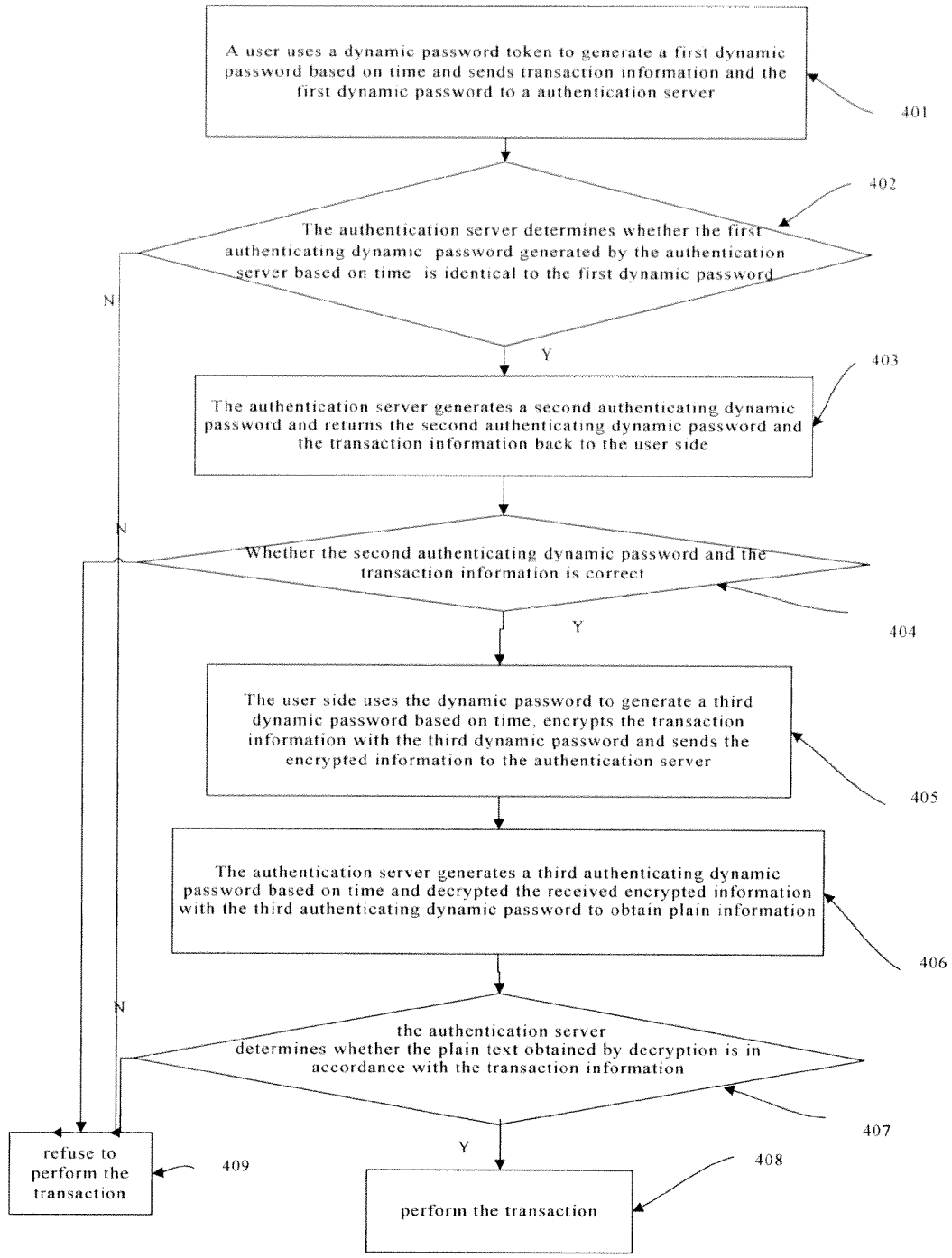
FIG. 4 is a flow chart illustrating a transaction signature method provided by embodiment 2 of the invention.

FIG. 4 is a flow chart illustrating a transaction signature method provided by embodiment 2 of the invention. The embodiment of the invention is illustrated by the example that a user performs transaction signature by a verification method of a dynamic password. The method of the embodiment of the invention includes the following steps:

401, when a user needs to do transaction, the user uses a dynamic password token to generate a first dynamic password at first; transaction information and the first dynamic password is sent to an authentication server by a client side; specifically, the transaction information includes a user account, a user password, a transaction sum, a transaction time and current type, etc.

In the Step 401, the dynamic password token generates a dynamic password according to an inbuilt dynamic password algorithm; the option of dynamic factor can be based on time or event for generating dynamic password. In the embodiment of the invention, preferably, the dynamic password is generated on time (for example, by counting time). Correspondingly, the embodiment of the invention can further generate a dynamic password based on event. Triggering the dynamic password token to generate a dynamic password includes, but not limited to, the two following ways:

The first way is that the dynamic password token is arranged with a button. The user presses the button for the first time to generate a first dynamic password, presses the button for the second time to generate a second dynamic password and presses the button for the third time to generate a third dynamic password;

The second way is that there are three dynamic generating buttons arranged on the dynamic password token; the first button is pressed to generate a first dynamic password; the second button is pressed to generate a second dynamic password and the third button is pressed to generate a third dynamic password;

402, the authentication server receives the transaction information and the first dynamic password sent by the user side, the authentication server generates a first authenticating dynamic password and determines whether the first authenticating dynamic password generated by the authentication server is identical to the first dynamic password; if yes, the received first dynamic password is correct, go to step 403, otherwise, the received first dynamic password is not correct, go to step 409;

In the embodiment of the invention, the information of the dynamic password token held by the user is preregistered in the authentication server and the algorithm used by the authentication server to generate a dynamic password is identical to the algorithm of the dynamic password token. The information of the dynamic password token includes, but not limited to, the serial number of the dynamic password token and a key seed corresponding to the serial number. The serial number and the key seed, which are allocated to the dynamic password token by the authentication server, are unique and stored in the dynamic password token as well.

In the Step 402, the algorithm used by the authentication server to generate a first authenticating dynamic password is identical to the algorithm used by the dynamic password token to generate a first dynamic password and both the first authenticating dynamic password and the first dynamic password are generated based on counting time (or counting times). Wherein, the algorithm above can include HMAC-SHA1, MD5, SHA-1, SHA-256, etc.

The authentication server can use the following ways to verify whether the received first dynamic password is correct:

The first way is that the authentication server generates a single first authenticating dynamic password and compares the first authenticating dynamic password and the received first dynamic password directly, if they are identical, the received first dynamic password is regarded to be correct; otherwise, the received first dynamic password is regarded to be not correct;

The second way is that when the used dynamic factor (e.g. time) includes a time window (details is given in the following), the authentication server generates a set of dynamic, passwords as the first authenticating dynamic password authentication server compares all of the dynamic passwords of the time window one by one with the received first dynamic password, if one of the dynamic passwords of the time window is identical to the received first dynamic password, the received first dynamic password is regarded to be correct; if none of the dynamic password of the time window is identical to the received first dynamic password, the received first dynamic password is regarded to be incorrect.

Preferably, before the authentication server verifying whether the first dynamic password is correct, the authentication server can also determine whether the received first dynamic password has been used, if no, performing the verification process; otherwise, returning error message to the user side. Thereby, by determining whether the first dynamic password has been used, the loss of user, which caused by that the hacker monitors the dynamic password input by the user and logs on the authentication server with the same dynamic password and requests to do transaction right away, can be avoided. Preferably, a certain time interval can be set, for example, 10 minutes. That is, if the received first dynamic password has not been used in 10 minutes, the authentication server verifies the received first dynamic password.

Thereby, the authentication server can generate a dynamic password according to the dynamic factor. For example, the first authenticating dynamic password, the second authenticating dynamic password or a third authenticating dynamic password in later description. The following is an example of generating a dynamic password based on counting time:

Generating a dynamic password based on counting time means generating a dynamic password based on a dynamic factor which is a difference between the time of the generating the dynamic password by a device (a dynamic password token or a authentication server) and a preset initial time. For example, the counting time unit is 1 minute in the embodiment of the invention. Generally, the dynamic password token sets an initial time at the time of initializing, for example, 00:00 (hour:minute) on Jan. 1, 2000. when a dynamic password is generated at 01:00 (hour:minute) on Jan. 1, 2000, the dynamic password token or the authentication server gets 60 minutes by 01:00 (hour:minute) on Jan. 1, 2000 minus the initial time 00:00 (hour:minute) on Jan. 1, 2000 and 60 minutes is used as the dynamic factor for generating the dynamic password. Because the dynamic password token and the authentication server counts time independently, asynchrony often happens in counting time. Therefore the time factor needs to be aligned. The method for aligning the time factor is as the following:

For example, if the initial time of the dynamic password token and the authentication server is set to be 00:00 (hour:minute) on Jan. 1, 2000 and the counting time of the dynamic password token for generating a dynamic password is 01:00 (hour:minute) on Jan. 1, 2000, the dynamic factor used by the dynamic password token is 60 at that time. However, when the authentication server generates a first authenticating dynamic password, the base time of the authentication server is 01:02 (hour:minute) on Jan. 1, 2000 because the error of counting time and data transfer, that is, the dynamic factor should be 62. When the authentication server generates a dynamic password, a floating range of time is set for the dynamic factor, for example, ±2 minutes. The floating range is called time window in the embodiment of the invention, e.g. the value range of the dynamic factor can be set to be [59,65]. Then a set of first authenticating dynamic passwords are generated based on 62±3 and the maximum number of the passwords is 7. That is, the factors used by the authentication server to generate the first authenticating dynamic passwords are 59, 60, 61, 62, 63, 64 and 65 respectively. The first authenticating dynamic passwords are compared with the first dynamic password one by one. For example, a first authenticating dynamic password is generated according to a first dynamic factor 59; if the first authenticating dynamic password generated by the authentication server is different from the received first dynamic password, the authentication server goes on to generate another first authenticating dynamic password with next factor 60 and compares the first authenticating dynamic password with the received first dynamic password, as so on, Obviously, if the first dynamic password is verified to be correct when the factor is 60, the correct factor is obtained and the dynamic factor is updated to 60 and the counting time offset between the authentication server and the dynamic password token is calculated out to be 2 minutes. When calculating a dynamic password next time, the dynamic factor stored in the authentication server can be aligned in the following way: an updated dynamic factor=current counting time of generating a second authenticating dynamic password by the above authentication server−initial time of the entity described above−the counting time offset described above.

For example, the authentication server generates a second authenticating dynamic password at 01:03 (hour:minute) on the Jan. 1, 2000. The updated dynamic factor=01:03 (hour:minute) on the Jan. 1, 2000−00:00 (hour:minute) on the Jan. 1, 2000−2=61.

It should be noted that in the embodiment of the convention, the counting time unit for calculating a dynamic factor can be set according to real situation such as security and calculation accuracy. For example, when a dynamic password is generated based on counting time, a dynamic factor can be calculated based on the time unit such as 1 minute, 30 seconds or 1 second and the dynamic password is generated according to the dynamic factor.

The operation of aligning the dynamic factor stored in the authentication server described above can be performed in step 402 or in the following step 403.

403, the authentication server generates a second authenticating dynamic password and returns the second authenticating dynamic password and the transaction information back to the user side;

Hereby, the authentication server can calculate the difference (equals to 63) between the counting time for generating the second authenticating dynamic password (for example, 01:03(hour:minute) on Jan. 1, 2000) and the initial time (01:00 on Jan. 1, 2000), and make the difference minus the above counting time offset (equals to 2) to get the updated dynamic factor (equals to 61) and generate the second authenticating dynamic password according to the updated dynamic factor.

In the embodiment of the invention, because the authentication server can align the dynamic factor, the authentication server can generate the second authenticating dynamic password according to the aligned dynamic factor. Preferably, the second authenticating dynamic password is an independent dynamic password.

In addition, the step can be taken in the following way: the authentication server generates a second authenticating dynamic password at regular time intervals and sends the second authenticating dynamic password to the user side. Preferably, the above regular time interval can be longer than 0 and should be in a safe range. The following is an example of 1 minute as the regular time interval:

When the authentication server receives the first dynamic password and verifies that the first dynamic password is correct, the authentication server starts to count time. And in the first minute after counting time, the authentication server generates the first one of the second authenticating dynamic password by using the above method according to the current counting time, the preset initial time and the counting time offset and sends the first one of the second authenticating dynamic password to the user side; Then, in the second minute, the second one of the second authenticating dynamic password is generated and sent to the user side; In the third minute, the third one of the second authenticating dynamic password is generated and sent to the user side, and so on, so as to avoid the problem caused by delay when the user receives or authenticates the second authenticating dynamic password. Preferably, when sending a second authenticating dynamic password to the user side, the times for the authentication server to return the second authenticating dynamic password back to the user side should be limited to a maximum value. For example, if the authentication server returns the second authenticating dynamic password back to the user side for 10 times and the user side performs no operation, the user is informed that the time is out for having no response and the verification is failed.

Preferably, in order to avoid that the first one of the second authenticating dynamic password generated by the server and the first dynamic password (a correct first dynamic password) generated by the dynamic password token used by the user are identical because their generating time is too close, when the authentication server generates the first one of the second authenticating password, the dynamic factor can be generated according to the next minute of the current counting time and generates the second authenticating dynamic password for the first time according to the dynamic factor. In addition, there are other ways to avoid that the time of the generating the second authenticating dynamic password and the time of the generating the first dynamic password are identical. For example, after the first dynamic password is verified to be correct, waiting for two counting time units, and then the second authenticating dynamic password is generated at the time of the third time units. In this way, the time of the generating the second authenticating dynamic password and the time of the generating the first dynamic password are different.

When the authentication server generates a second authenticating dynamic password, if the time interval between generating the second authenticating dynamic password and generating the first dynamic password is too short, the first dynamic password might be identical to the second authenticating dynamic password. In order to make the second authenticating dynamic password be different from the first dynamic password, a preset step size can be added to the updated dynamic factor when the second authenticating dynamic password is generated, and then the second authenticating dynamic password is generated according to the dynamic factor with the added step size so as to avoid the security vulnerability caused by that the second authenticating dynamic password and the first dynamic password are identical.

In order to avoid verification failure caused by network delay when the authentication server returns back the second authenticating dynamic password to the user side, a method for the authentication server to generate the second authenticating dynamic password further includes that the authentication server generates a set of dynamic passwords as the second authenticating dynamic password and returns the set of dynamic passwords to the user side. For example, in step 402, if the counting time offset is determined to be −2 minutes after the dynamic factor is aligned, the time of generating the second authenticating dynamic password equals to the time of the authentication server after synchronization plus a step size, e.g. 01:00(hour:minute) on the Jan. 1, 2000 plus 1 minute, and the dynamic factor should be 61. In order to generate a set of dynamic passwords, a time window+5, which is a backward offset, is added. That is, six dynamic passwords as the second authenticating dynamic password are generated by using 61, 62, 63, 64, 65 and 66;

404, the user checks the received transaction information and the second authenticating dynamic password, if they are correct, go to step 405; otherwise, go to step 409;

The specific process of checking comprises the following step: after the user side receives the transaction information and the second authenticating dynamic password returned from the authentication server, the user checks whether the transaction information displayed at the user side is correct, if the transaction information is not correct, the user can cancel the transaction directly; if the transaction information is correct, the second authenticating dynamic password needs to be checked. The specific way for checking the second authenticating dynamic password is as the following: the user uses the dynamic password token to generate a second dynamic password and compares the second dynamic password with the received second authenticating dynamic password, if they are identical, the verification is regarded to be success; otherwise, the verification is regarded to be failed and the user can cancel the transaction directly.

It should be noted that when a dynamic password is generated based on time (the dynamic factor is a time factor) and the user receives the second authenticating dynamic password sent from the authentication server, the user needs to use the dynamic password token to generate a second dynamic password in a regulated time. The reason is as the following:

The dynamic password token and the authentication server count time independently. In the process of verification, the generation of the second authenticating dynamic password by the authentication server is earlier than the generation of the second dynamic password by the dynamic password token, therefore the time factor for generating the second authenticating dynamic password by the authenticating serve is different from the time factor for generating the second dynamic password by the dynamic password token such that the dynamic passwords are different. Therefore the method for improvement can be used: after successful verification of the first dynamic password by comparison, time is aligned so as to synchronizing the time between the dynamic password token and the authentication server; the aligned time is used as base time and a time interval, such as 1 minute, is set and the time got by extending 1 minute from the base time is used as the time factor to generate the second authenticating dynamic password (the second authenticating dynamic password is a dynamic password), e.g. the dynamic passwords generated in the 1 minute are identical. The authentication server generates and sends the second authenticating dynamic password back to the user side. Then the user should use the dynamic password to generate the second dynamic password in the regulated time, which is less than 1 minute, such that the second dynamic password generated by the dynamic password should be identical to the second authenticating dynamic password generated by the authentication server;

In step 404, if the authentication server returns a set of the second authenticating dynamic passwords generated (6 second authenticating dynamic passwords) at one time back to the user side, after the user side uses the dynamic password token to generate the second dynamic password, the user compares the second dynamic password with the set of the second authenticating dynamic passwords one by one; if the second dynamic password is identical to one of the second authenticating dynamic passwords, the second authenticating dynamic password is correct, otherwise, the authentication server is regarded to be illegitimate and the transaction should be canceled.

405, the user confirms that the transaction information and the second authenticating dynamic password are correct and uses the dynamic password to generate a third dynamic password; the user side receives a confirming information from the user and uses the third dynamic password to encrypt the transaction information to obtain cipher text and sends the cipher text to the authentication server; in the embodiment of the invention the transaction information should be completely identical to the transaction information sent by the user side for the first time.

406, the authentication server generates a third authenticating dynamic password; in specific realization, the step can use the method described in step 403 which includes the method of verifying whether the third dynamic password has been used and avoiding generating repeated factor for generating dynamic password. Refer to the process of step 403 for detail.

407, the authentication server decrypts the received cipher text with the generated third authenticating dynamic password to get plain text and determines whether the plain text is in accordance with the transaction information, if yes, go to step 408, otherwise, go to step 409;

It should be noted that the authentication server and the user side performs encryption or decryption with an identical algorithm, for example, AES, 3DES and RSA, etc.

Preferably, determining, by the authentication server, whether the information obtained by decryption is in accordance with the transaction information specifically is using the third dynamic passwords generated in the time window, by the authentication server, to decrypt the transaction information to get a set of plain information, comparing the transaction information with the set of plain information one by one. When one piece of the plain information is identical to the transaction information, the comparison is regarded to be successful; if no piece of the plain information is identical to the transaction information, the comparison is regarded to be failure;

408, perform the transaction;

409, refuse to perform the transaction.

In the embodiment of the invention, the above refusing the transaction includes the following situation: in step 402, when the authentication server determines that the first dynamic password is not correct, the authentication server returns message of failed verification back to the user side and refuses to perform the transaction; In step 407, when the authentication server verifies that the information by decryption is not in accordance with the transaction information, the authentication server suggests that signature is failed and refuses to perform transaction.

In the transaction signature method, the authentication server and the system thereof provided by the embodiment of the invention, transaction information and the first dynamic password is needed at the time of trading, the first dynamic password is for the authentication server to verify; in addition, the authentication server needs to send the second authenticating dynamic password to the user side for verification; in this way, the authentication server and the user side can verify the legitimate identity with each other. After the legitimate identity is verified with each other by the authentication server and the user side, the user side sends the transaction information which is encrypted to the authentication server again; if the transaction information for the first time is identical to the transaction information for the second time, corresponding transaction is performed.

Therefore, the transaction signature method, the authentication server and the system thereof provided by the embodiment of the invention can confirm the legitimate identities of two transaction parties and improve the security for the user to do transaction and avoid loss caused by logging on a phishing website by the user.

Embodiment 3

Figure 5:
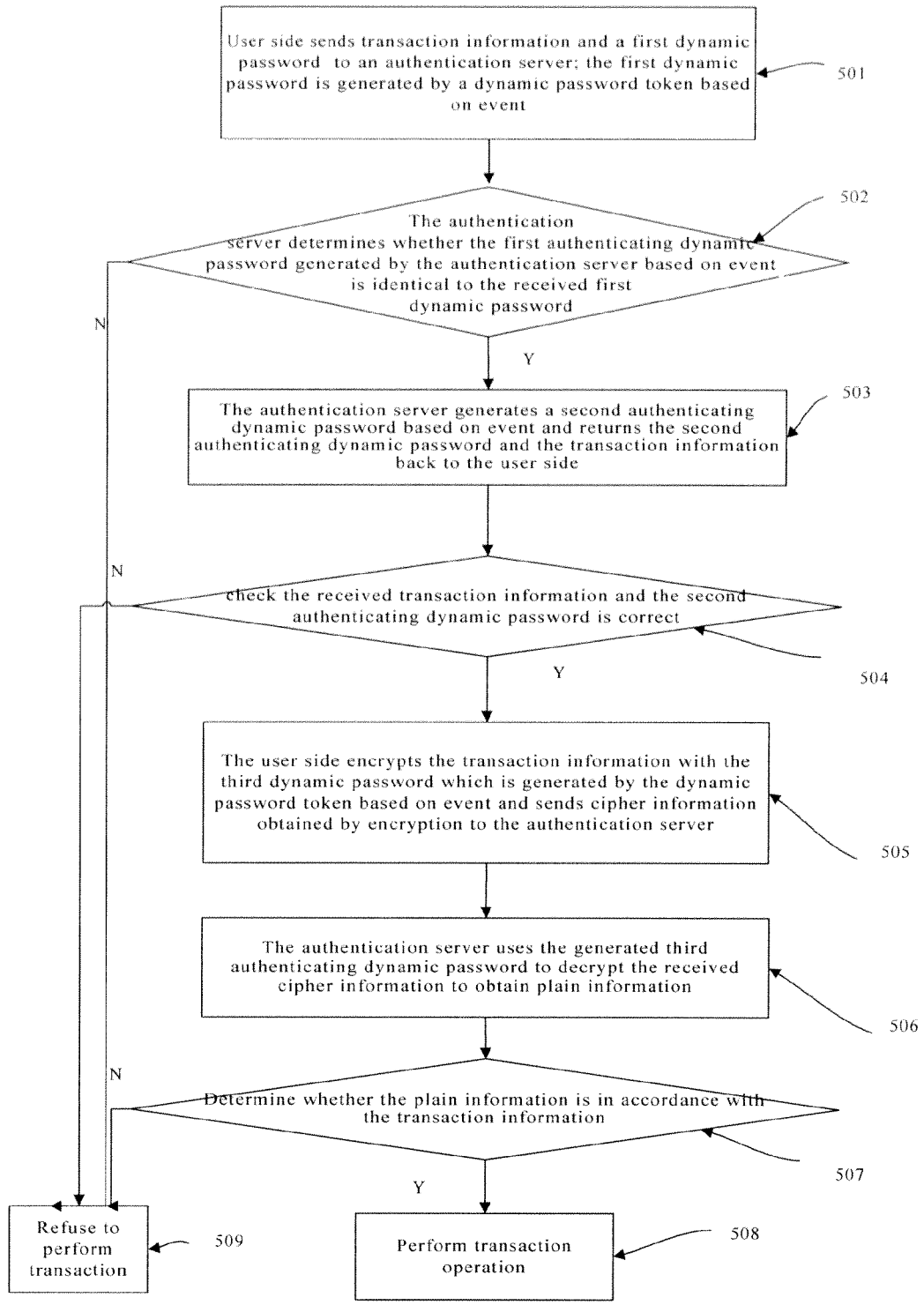
FIG. 5 is a flow chart illustrating a transaction signature method provided by embodiment 3 of the invention.

FIG. 5 is a flow chart illustrating a transaction signature method provided by embodiment 3 of the invention. The embodiment of the invention gives an example of performing transaction signature via authenticating the dynamic password by a user. The method of the embodiment of the invention includes the following steps:

501, the user uses the dynamic password token to generate a first dynamic password; and transaction information and the first dynamic password is sent to an authentication server via the user side; Specifically, the transaction information tides a user account, a user password, transaction sum, transaction time, currency type, etc;

Thereby, the dynamic password token generates a dynamic password according to an inbuilt dynamic password algorithm; the dynamic factor for generating a dynamic password can be based on time or event. In the embodiment the invention, preferably, the dynamic factor can be based on event (for example, counting tunes) for generating a dynamic password. Correspondingly, a dynamic password can be generated based on time (for example, counting time). The trigger ways for generating a dynamic password by a dynamic password token includes, but not limited to, the following two ways:

The first that the dynamic password token is arranged with a button. The user presses the button for the first time to generate a first dynamic password, presses the button for the second time to generate a second dynamic password and presses the press button for the third time to generate a third dynamic password;

The second way is that there are three dynamic generating buttons arranged on the dynamic password token; the first button is pressed to generate a first dynamic password; the second button is pressed to generate a second dynamic password and the third button is pressed to generate a third dynamic password;

502, the authentication server receives the transaction information and the first dynamic password sent by the user side, then the authentication server generates a first authenticating dynamic password and determines whether the first authenticating dynamic password generated by the authentication server is identical to the received first dynamic password, if yes, the received first dynamic password is correct, go to step 503; otherwise, the first dynamic password is not correct and go to step 509; the authentication server in the embodiment of the invention may use the two ways provided in 402 to authenticate whether the received first dynamic password is correct, no more details is given here;

In the embodiment of the invention, the information of the dynamic token held by the user is preregistered in the authentication server and the authentication server generates a dynamic password by using an algorithm which is identical to the algorithm used by the dynamic password token. The information of the dynamic password token includes, but not limited to, a serial number of the dynamic password token and a key seed corresponding to the serial number, the serial number and the key seed are allocated to the dynamic password token by the authentication server and are unique; and the serial number and the key seed are stored in the dynamic password token.

Thereby, the algorithm used by the authentication server to generate a first authenticating dynamic password is identical to the algorithm used by the dynamic password token to generate the first dynamic password; the dynamic passwords are generated based on counting time (or counting times); thereby, the algorithm can include HMAC-SHA1, MD5, SHA-1 or SHA-256, and the like.

In the embodiment of the invention, the authentication server generates a dynamic password according to a dynamic factor, which is illustrated by the following example. The embodiment of the invention gives an example of generating a dynamic password based on counting times as the following:

Generating a dynamic password based on counting times, that is, generating a dynamic password by taking the times of generating dynamic passwords as the dynamic factor, the dynamic factor for generating a dynamic password for the first time is count value of 1, the dynamic factor for generating a dynamic password for the second time is count value of 2, and so on; the count value is added by 1 or a preset step size when a dynamic password is generated every time. Because the dynamic password token and the authentication server count times respectively, which caused the value of counting times are not in accordance with each other; therefore, the counting times stored in the authentication server needs to be corrected. If the dynamic factor used by the dynamic password token for generating a first dynamic password is count value of 100, while the dynamic factor stored in the authentication server is count value of 95, here the floating range of the counting times when the authentication server generates the first authenticating dynamic password is 95-105, that is the floating range of the dynamic factor can be set to be [95,105]. Started from the dynamic factor, e.g. count value, of 95, a first authenticating dynamic password is calculated according to every dynamic factor; and then, comparing the first authenticating dynamic password with the received first dynamic password; if they are not identical, increasing the count value and keeping on calculating a first authenticating dynamic password.

From what is described above, when the authentication server generates a first authenticating dynamic password, a set of 11 at most authenticating dynamic passwords are generated according to the dynamic factors such as count values of 95, 96 ... 104, 105. The authentication server compares the received first dynamic password with the first authenticating dynamic passwords generated by the authentication server. For example, when the authentication server generates a dynamic password according to the count value of 100 as a dynamic factor, if the generated dynamic password is identical to the received first dynamic password, the first dynamic password is verified to be correct and the calculating of the first dynamic password is stopped.

Here the dynamic factor stored in the authentication server can be corrected, e.g. 100 is taken as a correct count value so as to keep the synchronization between count values of the dynamic password token and the authentication server. Then, the authentication server adds 1 (a preset step size) to the count value 100 and saves the increased count value as the dynamic factor for the next time of generating a dynamic password. If none of the dynamic password in the set of 11 dynamic passwords is identical to the received first dynamic password, the received first dynamic password is not correct.

The operating of aligning the dynamic factor stored in the authentication server can be performed in step 502 or in the following step.

503, the authentication server generates a second authenticating dynamic password and returns the second authenticating dynamic password and the transaction information back to the user side;

In the embodiment of the invention, the dynamic factor is aligned in step 502 such that the authentication server can generate the second authenticating dynamic password according to the corrected dynamic factor. Preferably, the second authenticating dynamic password here is a single dynamic password;

504, the user checks the received transaction information and the second authenticating dynamic password, if they are correct, go to step 505; otherwise, go to step 509;

The detail for the progress of checking is as the following steps after the user side receives the transaction information and the second authenticating dynamic password returned by the authentication server, the user checks and determines whether the transaction information displayed at the user side is correct; if the transaction information is not correct, the user can cancel the transaction directly; if the transaction information is correct, the user checks and determines whether the received second authenticating dynamic password is correct, if yes, the comparison is successful; otherwise, the comparison is failed and the user can cancel the transaction directly.

505, after determining that the transaction information and the second authenticating dynamic password are correct, the user uses the dynamic password token to generate a third dynamic password; After receiving a confirming information from the user, the user side encrypts the transaction information with the third dynamic password and sends cipher information obtained by encryption to the authentication server; the transaction information here is completely identical to the transaction information sent by the user side to the authentication server at the first time;

506, the authentication server generates a third authenticating dynamic password, which can be realized by the method described in step 403; the method includes whether the third dynamic password has been used and preventing the factor of generating a dynamic password from being repeated; refer to step 403 for details.

507, the authentication server uses the generated third authenticating dynamic password to decrypt the received cipher information to obtain plain information; and determines whether the plain information is in accordance with the transaction information, it yes, go to 508; otherwise, go to 509;

It should be noted that the algorithms for encrypting or decrypting the transaction information, such as AES, 3DES, RSA, etc., used by the authentication server and the user side are identical.

Thereby, if the authentication server generates a set of authenticating dynamic passwords as the third authenticating dynamic password in step 506, the authentication server determines whether the plain information obtained by decryption is in accordance with the transaction information in the following way. The authentication server uses the third authenticating dynamic password generated in a time window to decrypt the transaction information and obtains a set of plain information after decryption; the authentication server compares the transaction information with the set of plain information piece by piece, when one piece of the plain information in the set of plain information is identical to the transaction information, the comparison is regarded as success; if no piece of plain information in the set of plain information is identical to the transaction information, the comparison is regarded as failure,

508, perform transaction operation;

509, refuse to perform transaction.

According to the invention, after three times of dynamic password authentication, the legitimacy of the server can be authenticated by using a dynamic password token; with the cooperation of the user side, a common dynamic password token can perform the function of transaction signature, which enhances the security of common dynamic password authentication. The invention prevents the user from the loss caused by logging on a phishing website, enhances the security of the transaction and preventing the attack from the third party.

The embodiment of the invention is used in all kinds of transaction signature, for example, the transaction signature of the e-bank, etc.

Embodiment 4

According to the embodiment of the invention, a method for authenticating a dynamic password is provided.

Figure 6:
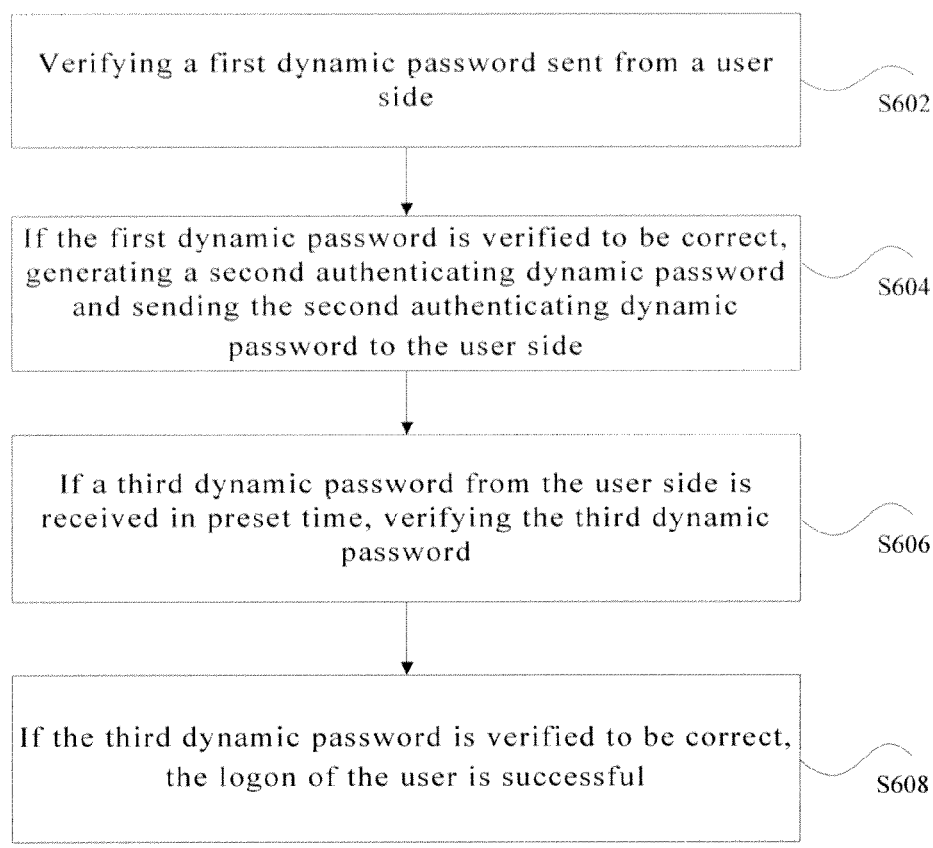
FIG. 6 is a flow chart illustrating a dynamic password verification method provided by embodiment 4 of the invention.

Referring to FIG. 6, the method includes the following steps S602 to S608:

S602, verifying a first dynamic password sent from a user side;

S604, if the first dynamic password is verified to be correct, generating a second authenticating dynamic password and sending the second authenticating dynamic password to the user side;

S606, if a third dynamic password from the user side is received in preset time, verifying the third dynamic password;

S608, if the third dynamic password is verified to be correct, the logon of the user is successful; otherwise, the logon of the user is failed.

Correspondingly, before verifying the first dynamic password from the user side, user name information can be received. Thereby, finding a number of a dynamic password token used by the user side for generating the first dynamic password according to the user name information; and finding the corresponding seed and dynamic factor according to the number so as to verify the first dynamic password according to the authenticating dynamic password generated by the seed and the dynamic factor.

Correspondingly, after sending the second dynamic password to the user side, the user verifies the received second authenticating dynamic password. After the user verifies that the second authenticating dynamic password is correct, the user side sends the third dynamic password to an entity, such as an authentication server, which generates a second authenticating dynamic password.

Correspondingly, generating a second authenticating dynamic password includes updating the dynamic factor; generating the second authenticating dynamic password by using the updated dynamic factor.

Generating the second authenticating dynamic password can include generating the second authenticating dynamic password based on time or event:

If the second authenticating dynamic password is generated based on event, updating the dynamic factor can include setting the dynamic factor to be a first dynamic factor used by the user side for generating the first dynamic password; thereby, the first dynamic factor is a count value when the user side generates the first dynamic password; adding a preset step size to the dynamic factor so as to get the updated dynamic factor.

If the second authenticating dynamic password is generated based on time, updating the dynamic factor includes: setting the dynamic factor to be a first dynamic factor used by the user side to generate a first dynamic password, thereby, the first dynamic password is a difference between a counting time or generating the first dynamic password by the user side and an initial time of the user side; the counting time offset is updated according to the dynamic factor. Thereby, the offset of counting time is a difference between the current time of an entity which generates a second authenticating dynamic password and the current time of the user side; generating the updated dynamic factor according to the counting time offset, counting time of generating the second authenticating dynamic password by the entity and the preset initial time of the entity.

Preferably, the updated dynamic factor=the counting time of generating the second authenticating dynamic password generated by the entity–the initial time of the entity–the counting time offset.

If the second authenticating dynamic password is generated based on time, generating the second authenticating dynamic password and sending the second authenticating dynamic password to the user side includes generating a dynamic password at regular time intervals; taking the generated dynamic password as the second authenticating dynamic password and sending the second authenticating dynamic password to the user side so as to make the user to verify the authenticating dynamic password.

verifying the first dynamic password can include generating the first authenticating dynamic password; determining whether the first dynamic password is identical to the first authenticating dynamic password, if yes, the first dynamic password is correct;

Or verifying the first dynamic password can include generating a first set of authenticating dynamic passwords; determining whether one of the set of authenticating dynamic passwords is identical to the first dynamic password, if yes, the first dynamic password is correct.

The algorithm of generating the first authenticating dynamic password is identical to the algorithm of the first dynamic password. The algorithm of generating an authenticating dynamic password in the set of the authenticating dynamic passwords is identical to the algorithm of generating the first dynamic password.

If the third dynamic password is received from the user side in preset time, the method further includes receiving a static password from the user side in the preset time so as to determine that the user logs on successfully in case the third dynamic password and the static password are verified to be correct.

Verifying the third dynamic password can include generating a third authenticating dynamic password, determining whether the third authenticating dynamic password is identical to the third dynamic password, if yes, the third dynamic password is correct;

Or, verifying the third dynamic password can include generating a third set of authenticating dynamic passwords; determining whether one authenticating dynamic password in the third set of authenticating dynamic passwords is identical to the third dynamic password, if yes, the third dynamic password is correct.

The algorithm of generating the third authenticating dynamic password is identical to the algorithm of generating the third dynamic password; the algorithm of generating an authenticating dynamic password in the third set of authenticating dynamic passwords is identical to the algorithm of generating the third dynamic password.

If the second authenticating dynamic password is generated based on time, the second authenticating dynamic password is different from the first authenticating dynamic password, which can be realized in the following way. Adding a preset step size to the updated dynamic factor, and generating the second authenticating dynamic password according to the updated dynamic factor with an added preset size.

In the same way, if the second authenticating dynamic password is generated base on time, the third authenticating dynamic password is different from the second authenticating dynamic password, which can be realized in the following way. When the third authenticating dynamic password is generated, the dynamic factor is updated at first, in which the dynamic factor is updated by using the method adapted by updating the dynamic factor after generating the first authenticating dynamic password. Then adding a preset step size to the updated dynamic factor and then generating the third authenticating dynamic password by using the dynamic factor with the added preset step size.

Embodiment 5

Figure 7:
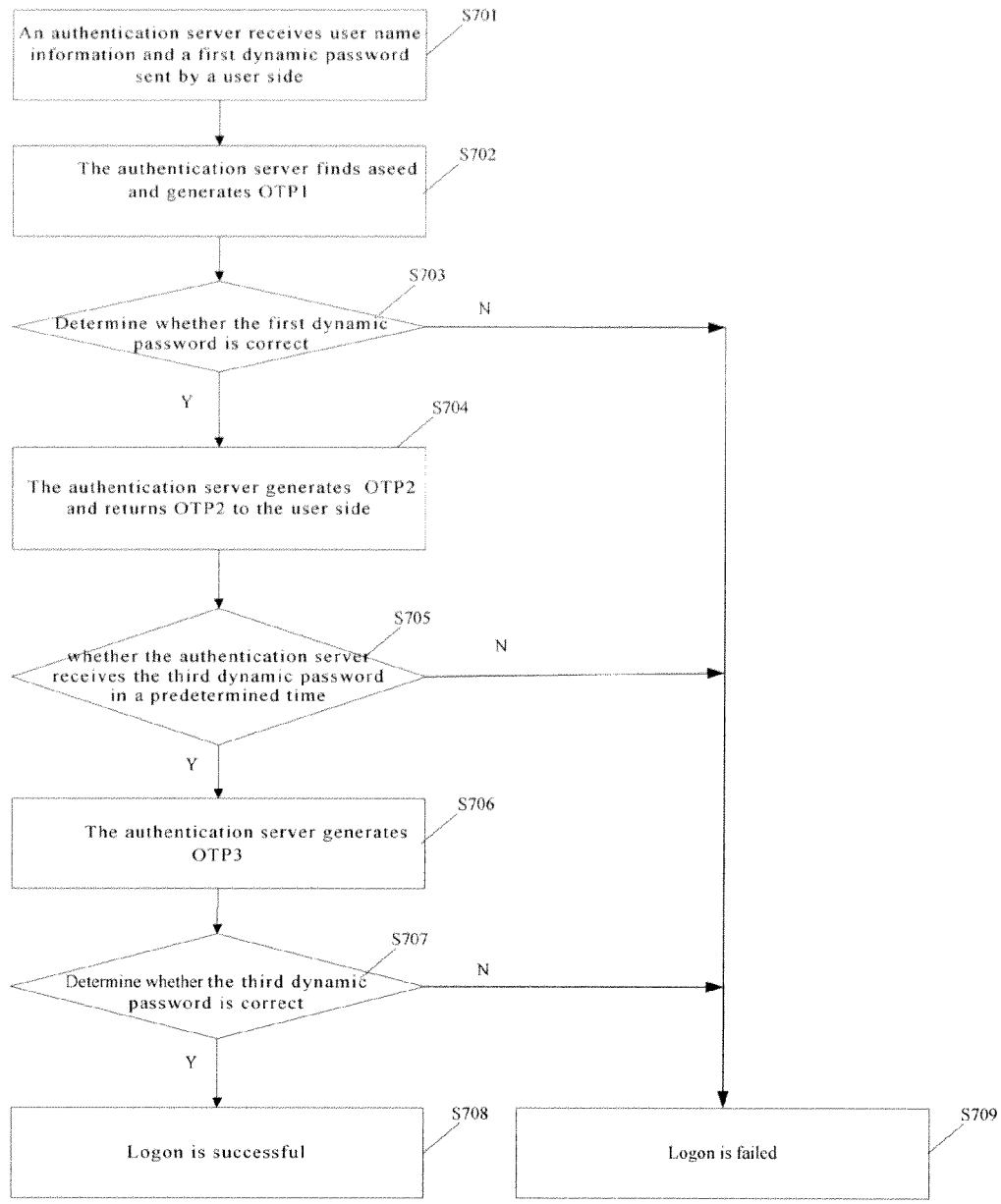
FIG. 7 is a flow chart illustrating a dynamic password verification method provided by embodiment 5 of the invention.

FIG. 7 is a flow chart illustrating a dynamic password verification method provided by embodiment 5 of the invention. Referring to FIG. 7, a method for verifying dynamic password is provided. By an example of logging on e-bank by a user via the way of verifying dynamic password, the embodiment of the invention illustrates specifically a verifying flow progress of dynamic password authentication server. In the embodiment of the invention, a dynamic password is generated by using counting times (e.g., event). The method of verifying dynamic password according to the embodiment of the invention includes the following steps:

S701, an authentication server receives user name information and a first dynamic password sent by a user side.

In the embodiment of the invention, before starting the logon verifying progress, a dynamic password token held by a user is bonded with the user name in formation of the user. The dynamic password token has a unique number, stores a unique seed corresponding to the number and can generate dynamic password according to an inbuilt dynamic password algorithm; the dynamic password algorithm is identical to the algorithm for generating the dynamic password at a server side. Thereby, the user name information can include at least one of the following: a user name, an account number, an identity number and a mailbox; the user side can include one of the following: a user side host computer and user side dynamic password token.

In the embodiment of the invention, the dynamic password token can be arranged with a button. The user presses the button for the first time to generate a first dynamic password, presses the button for the second time to generate a second dynamic password and presses the button for the third time to generate a third dynamic password;

or the dynamic password token can be arranged with three dynamic password generating buttons; a first button is pressed to generate a first dynamic password; a second button is pressed to generate a second dynamic password and a third button is pressed to generate a third dynamic password.

The user inputs user name, the first dynamic password to the user side host computer and sends them to the authentication server via the user side host computer.

For generating a dynamic password, a dynamic factor can be based on time or event. In the embodiment of the invention, the dynamic factor based on event (e.g. counting times) is used for generating a dynamic password. Preferably, the dynamic password can be generated based on time (e.g. counting time) in the embodiment of the invention, which is described in later embodiment of the invention.

S702, The authentication server finds the number and the seed corresponding to the dynamic password token according to the received user name information, the dynamic factor and generates a first authenticating dynamic password OTP1.

Thereby, the algorithm for generating OTP1 by the authentication server is identical to the algorithm for generating the first dynamic password by the dynamic password token and both the dynamic passwords are generated based on counting times. Thereby, the algorithm above can include HMAC-SHA1, MD5, SHA-1 and SHA-256, etc.

S703, the authentication server verifies whether the first dynamic password is correct, if yes, go to S704; otherwise, go to S709, Thereby, in S702, when the authentication server generates OTP1, the authentication server can generate one dynamic password or a set of dynamic passwords as OTP1, that is to say, OTP1 can be a set of dynamic passwords.

The authentication server can use the following methods to verify whether the first dynamic password is correct:

1) when OTP1 is one dynamic password, the authentication server compares the first dynamic password with OTP1; if they are identical, the first dynamic password is regarded to be correct; otherwise, the first dynamic password is regarded to be incorrect;

2) When the authentication server uses a set of factors which are consecutively increased to generate a first authenticating dynamic password, the first authenticating dynamic password OTP1 includes a set of dynamic passwords, the authentication server compares the set of dynamic passwords with the first dynamic password, when one dynamic password of OTP1 is identical to the first dynamic password, the comparison is regarded to be success and the first dynamic password is correct; if none of the dynamic password of OTP1 is identical to the first dynamic password, the verification is regarded to be failed and the first dynamic password is incorrect.

Hereby, the authentication server can generate a dynamic password, such as the first authenticating dynamic password, the second authenticating dynamic password or a third authenticating dynamic password described later, according to a dynamic factor. The following is an example taken by the embodiment of the invention to illustrate generating a dynamic password based on counting times.

Generating a dynamic password based on counting times, that is, generating a dynamic password by taking the times of generating dynamic passwords as the dynamic factor, the dynamic factor for generating a dynamic password for the first time is the count value of 1, the dynamic factor for generating a dynamic password for the second time is the count value of 2, and so on; the count value is added by 1 or a preset step size every time when a dynamic password is generated. Because the dynamic password token and the authentication server count times respectively, which causes that the values of counting times are not in accordance with each other; therefore, the counting times stored in the authentication server needs to be corrected.

If the dynamic factor used by the dynamic password token to generate a first dynamic password is count value of 100, while the dynamic factor stored in the authentication server is count value of 95. At that time, when the authentication server generates OTP1, the floating range of the count value is from 95 to 105, e.g. the floating range of the dynamic factor can be set to be [95,105]. By starting from the dynamic factor (e.g. count value) of 95, a first authenticating dynamic password is generated according to one of the dynamic factors. And then, comparing the first authenticating dynamic password calculated with the first dynamic password; if they are not identical, increasing the count value and keeping on calculating another first authenticating dynamic password.

From what is described above, when the authentication server generates a first authenticating dynamic password, a set of at most 11 authenticating dynamic passwords are generated according to the dynamic factors which are the count values of 95, 96 . . . 104, 105 respectively. The authentication server compares the received first dynamic password with the first authenticating dynamic passwords generated by the authentication server. For example, when the authentication server generates a dynamic password according to the count vale of 100, if the generated dynamic password is identical to the received first dynamic password, the first dynamic password is verified to be correct and calculating the first dynamic password is stopped.

At that time, the dynamic factor stored at the authentication server can be aligned, that is, 100 is taking as a correct count value so as to keep the count values of the dynamic password token and the authentication server synchronous. Then, the authentication server adds 1 (or a preset step size) to the count value 100 and keeps the increased count value as the dynamic factor for generating a dynamic password next time. If none of the dynamic password in the set of 11 dynamic passwords is identical to the first dynamic password, the received first dynamic password is not correct.

It should be noted that the operation of aligning the dynamic factor stored at the authentication server can be performed in S703 or in the following S704.

S704, The authentication server generates a second authenticating dynamic password OTP2 and returns OTP2 to the user side.

In the embodiment of the invention, the dynamic factor is aligned in S703 such that the authentication server can generate a second authenticating dynamic password OTP2 according to the corrected dynamic factor, preferably, OTP2 here is regarded as a dynamic password.

After the user side received OTP2, the user uses the dynamic password token to generate a second dynamic password and compares the second dynamic password with OTP2, if they are identical, the comparison is regarded to be successful; and the user uses the dynamic password token again to generate a third dynamic password and sends the third dynamic password to the authentication server. If the second dynamic password is not identical to OTP2, the comparison is regarded to be failed and the user can regard that the authentication server is illegitimate and stop log on.

S705, whether the authentication server receives the third dynamic password in a predetermined time, if yes, go to step S706; otherwise, go to S709.

In the embodiment of the invention, the predetermined time is a valid time for receiving the third dynamic password. The authentication server verifies the third dynamic password which is received in the predetermined time and discards the third dynamic password which is not sent in the predetermined time and does not verify the third dynamic password. Thereby, the authentication server can set the predetermined time according to the actual situation. Thereby, to a great extent, limiting the time can prevent an attack from a hacker.

S706, the authentication server generates the third authenticating dynamic password OTP3.

The authentication server can find the number, the seed and a dynamic factor which are corresponding to the dynamic password token according to the received user name information and generate the third authenticating dynamic password OTP3.

Thereby, the algorithm for generating OTP3 by the authentication server is identical to the algorithm for generating the third dynamic password by the dynamic password token and both the dynamic passwords are generated based on counting times. Thereby, the algorithm above can include HMAC-SHA1, MD5, SHA-1 and SHA-256, etc.

S707, the authentication server uses OTP3 to verify the third dynamic password, if the third dynamic password is correct, go to S708; otherwise, go to step 709.

In the embodiment of the invention, the method for verifying the third dynamic password by the authentication server is that the authentication server compares OTP3 with the third dynamic password, if they are identical, the comparison is regarded to be successful and go to S708; otherwise, the comparison is regarded to be failed and go to S709.

Thereby, if OTP3 generated by the authentication server is a set of authenticating dynamic passwords, the authentication server authenticates the third dynamic password in the following way. The authentication server compares the third dynamic password with the set of authenticating dynamic passwords one by one, if one authenticating dynamic password in the set of authenticating dynamic passwords is identical to the third dynamic password, the comparison is regarded to be successful and go to S708; if none of the set of authenticating dynamic passwords is identical to the third dynamic password, the comparison is regarded to be failed and the verification is incorrect, go to S709.

In the embodiment of the invention, as the user side sending the third dynamic password, the user side can send a static password to the authentication server. Correspondingly, as the authentication server verifies the third dynamic password, the authentication server can verify the static password so as to prevent illegitimate logon which is caused by the missing of the dynamic password token or the dynamic password token being stolen, which makes the logon process to be much safer. Specifically, the authentication server receives the third dynamic password and the static password from the user side in a predetermined time, the authentication server verifies the static password and the third dynamic password, if both the static password and the third dynamic password are correct, go to S708; otherwise, go to S709, S708, Logon is success and transaction online can be started;

S709, Return an error.

In the embodiment of the invention, returning an error includes the following cases:

The authentication server returns an error that the first dynamic password is incorrect when the authentication server determines that the first dynamic password is not correct in S703.

The authentication server returns an error that the time is out for receiving the third dynamic password if the third dynamic password is not received in predetermined time in S705.

In S707, when the authentication server determines that the third dynamic password is incorrect, the authentication server returns an error that the logon is failed.

In the embodiment of the invention, the algorithms for generating dynamic password include HMAC-SHA1, MD5, SHA-1 and SHA-256, etc. Thereby, the algorithm for generating OTP1 by the authentication server and the algorithm for generating the first dynamic password by the dynamic password token are identical, the algorithm for generating OTP2 by the authentication server and the algorithm for generating the second dynamic password by the dynamic password token are identical; the algorithm for generating OTP3 by the authentication server and the algorithm for generating the third dynamic password by the dynamic password token are identical.

According to the invention, by three times of password verification, the legitimacy of a server can be verified by a dynamic password token such that the security of the dynamic password verification is enhanced and the user can avoid the loss caused by logon a phishing website by mistake.

Embodiment 6

Figure 8:
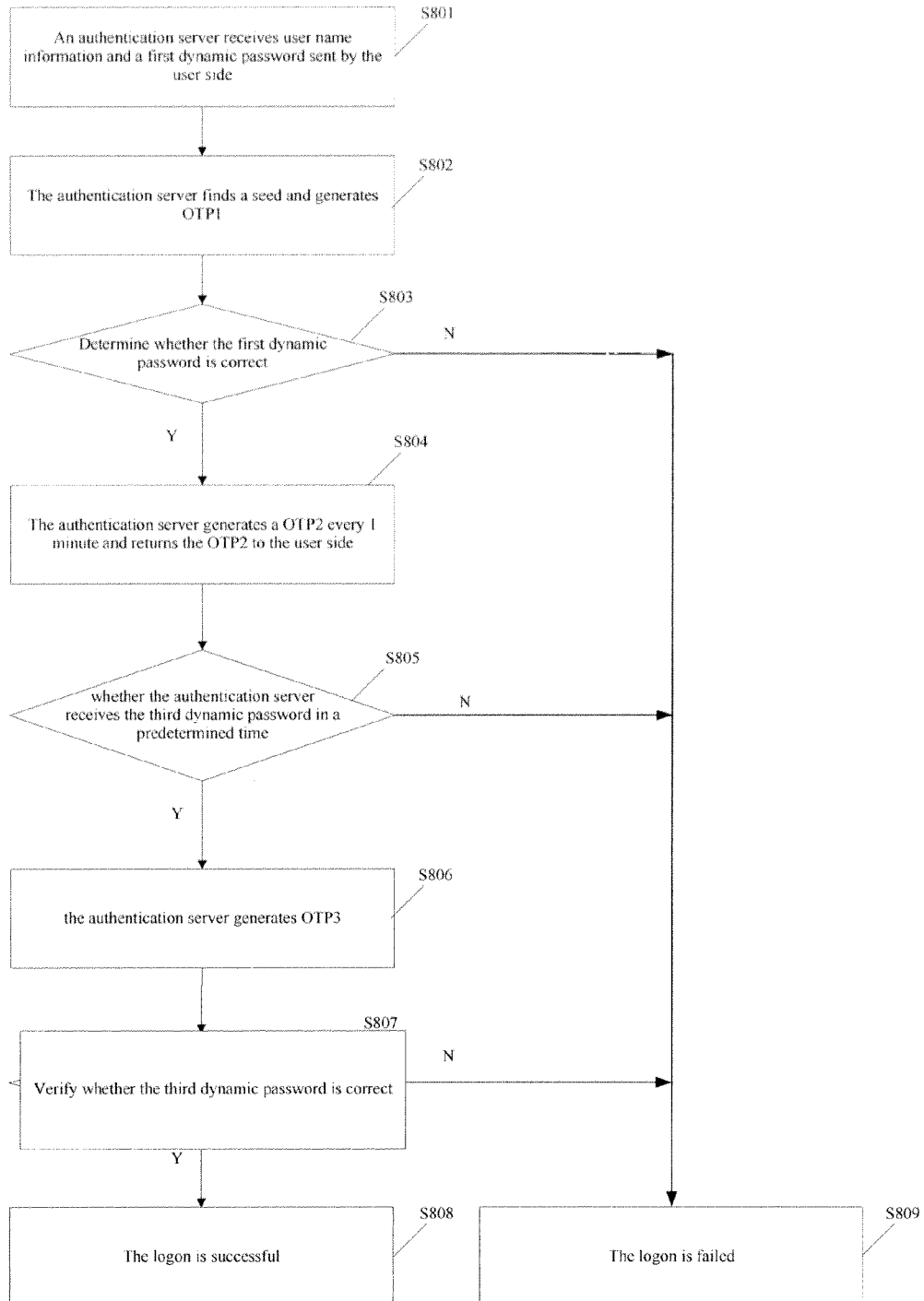
FIG. 8 is a flow chart illustrating a dynamic password verification method provided by embodiment 6 of the invention.

FIG. 8 is a flow chart illustrating a dynamic password verification method provided by embodiment 6 of the invention. The embodiment of the invention is illustrated by an example of logging on e-bank by a user via dynamic password verification. Specifically, the embodiment of the invention illustrates flow process of verification by a dynamic password authentication server in the process of logon by the user. Thereby, in the embodiment of the invention, a dynamic password is generated according to counting time (that is, the method is based on time). The verification method of the dynamic password according to the embodiment of the invention includes the following steps:

S801, an authentication server receives user name information and a first dynamic password sent by the user side.

In the embodiment of the invention, before logon verification process, a dynamic password token held by a user has been bond with the user name information of the user; the dynamic password token has a unique number, is stored inside with a unique seed corresponding to the number and can generate a dynamic password according to an inbuilt dynamic password algorithm. The dynamic password algorithm is identical to a dynamic password algorithm for generating the dynamic password by at a server side. Thereby, the user name information includes at least one of the following: a user name, an account number, an identity number and an e-mail.

In the embodiment of the invention, the dynamic password token can be arranged with a button. The user presses the button for the first time to generate a first dynamic password, presses the button for the second time to generate a second dynamic password and presses the button for the third time to generate a third dynamic password;

or the dynamic password token can be arranged with three dynamic password generating buttons; the first button is pressed to generate a first dynamic password; the second button is pressed to generate a second dynamic password and the third button is pressed to generate a third dynamic password.

The user inputs username information and the first dynamic password via host computer at a user side and the username information and the first dynamic password is sent to the authentication server by the user side.

The dynamic factor for generating a dynamic password can be based on time or event. In the embodiment of the invention, the dynamic password is generated based on time (i.e. by way of counting time). Preferably, in the embodiment of the invention, the dynamic password can be generated based on event (i.e. by way of counting times), which is described in the prior embodiment of the invention.

S802, The authentication server finds the number, the seed and the dynamic factor which are corresponding to the dynamic password token according to the received user name information, and generates a first authenticating dynamic password OTP1.

Thereby, the algorithm for generating OTP1 by the authentication server is identical to the algorithm for generating the first dynamic password by the dynamic password token and both the dynamic passwords are generated based on counting time. Thereby, the algorithm above can include HMAC-SHA1, MD5, SHA-1 and SHA-256, etc.

S803, the authentication server verifies whether the first dynamic password is correct, if yes, go to S804; otherwise, go to S809.

Wherein, in S802, when the authentication server generates OTP1, OTP1 is generated as one dynamic password or a set of dynamic passwords; i.e. OTP1 can be a set of dynamic passwords as well.

The authentication serve can use one of the following methods to verify whether the first dynamic password is correct:

1) when OTP1 is a dynamic password, the authentication server compares the first dynamic password with OTP1, wherein if they are identical, the first dynamic password is regarded to be correct; if they are not identical, the first dynamic password is regarded to be incorrect;

2) when the used dynamic factor (i.e. counting time) includes time window (details of implement method for time window is given later). OTP1 includes a set of authenticating dynamic passwords; the authentication server compares OTP1 which includes a set of dynamic passwords with the first dynamic password one by one; if one dynamic password of the set of dynamic passwords is identical to the first dynamic password, the comparison is regarded to be successful and the first dynamic password is correct; if none of the set of dynamic passwords is identical to the first dynamic password, the comparison is regarded to be failed and the first dynamic password is incorrect.

Preferably, before the authentication server verifying whether the first dynamic password is correct, the authentication server can determine whether the received first dynamic password has been used, if no, verifying whether the first dynamic password is correct; otherwise, returning an error message to the user side. Thereby, the role of determining whether the first dynamic password has been used is as the following: the loss, which caused by that the hacker monitors the dynamic password input by the user and logs on the server with the monitored dynamic password, can be avoided. Preferably, a certain time interval can be set, for example, 10 minutes. That is, if the first dynamic password has not been used by the user in the prior 10 minutes, the authentication server verifies the received first dynamic password.

Hereby, the authentication server can generate a dynamic password, such as a first authenticating dynamic password, a second authenticating dynamic password or a later described third authenticating dynamic password, according to a dynamic factor. The following is an example of generating a dynamic password based on counting time:

Generating a dynamic password based on counting time means generating a dynamic password based on a dynamic factor which is a difference between the time of the generating the dynamic password and a preset initial time. For example, the unit of counting time is 1 minute in the embodiment of the invention. Generally, the dynamic password token is set an initial time when it is initialized, for example, 00:00 (hour:minute) on Jan. 1, 2000. When a dynamic password is generated at 01:00 (hour:minute) on Jan. 1, 2000, the dynamic password token or the authentication server gets 60 minutes by 01:00 (hour:minute) on Jan. 1, 2000 minus the initial time 00:00 (hour:minute) on Jan. 1, 2000 and 60 minutes is used as the dynamic factor for generating a dynamic password. However, since the dynamic password token and the authentication server count time respectively, asynchronous happens in counting time between them. Therefore the time factor needs to be aligned. The method for aligning the time factor is as the following:

If the initial time of the dynamic password token and the authentication server is 00:00 (hour:minute) on Jan. 1, 2000 and the time for the generating a dynamic password is 01:00 (hour:minute) on Jan. 1, 2000, the dynamic factor used by the dynamic password token is 60 at that time. However, when the authentication server generates OTP1, the base time of the authentication server is 01:02 (hour:minute) on Jan. 1, 2000 because the error of counting time and data transfer, that is, the dynamic factor should be 62. When the authentication server generates a dynamic password, a floating range of time is set for the dynamic factor, for example, ±2 minutes. The floating range is called time window in the embodiment of the invention, that is, the value range of the dynamic factor can be set to be [59,65]. Then a set of at most 7 first authenticating dynamic passwords is generated based on 62±3. That is, the authentication server uses the dynamic factors 59, 60, 61, 62, 63, 64 and 65 respectively to generate the first authenticating dynamic passwords one by one. The first authenticating dynamic passwords are compared with the first dynamic password. For example, a first authenticating dynamic password is generated according to the first dynamic factor of 59. If the first authenticating dynamic password of the authentication server is different from the first dynamic password, the authentication server continuously generates another first authenticating dynamic password with next factor, e.g. 60, and compares the first authenticating dynamic password with the first dynamic password, and so on, until the comparison of the first authenticating dynamic password and the first dynamic password is successful.

Obviously, if the first dynamic password is verified to be correct when the dynamic factor is 60, the correct factor is obtained and the dynamic factor is updated to 60 and a time offset between the authentication server and the dynamic password token can be calculated to be 2 minutes. For calculating a dynamic password next time, the dynamic factor stored at the authentication server can be aligned by the following way:

an updated dynamic factor=current time of generating a second authenticating dynamic password by the authentication server−initial time of the entity above−time offset above.

For example, the authentication server generates a second authenticating dynamic password at 01:03 (hour:minute) on the Jan. 1, 2000. The updated dynamic factor=01:03 (hour:minute) on the Jan. 1, 2000−00:00 (hour:minute) on the Jan. 1, 2000−2=61.

It should be noted that the counting time unit for calculating a dynamic factor can be set according to real situation such as security and calculation accuracy. For example, when a dynamic password is generated based on time, the counting time unit can be in one minute, 30 seconds or 1 second for calculating the dynamic factor and a dynamic password is generated according to the dynamic factor.

The operation that aligning the dynamic factor stored at the authentication server above can be performed in S303 or in the following S304, S804, the authentication server generates a second authenticating dynamic password OTP2 and returns the OTP2 hack to the user side.

Thereby, the authentication server can calculate the difference (equals to 63) between the time for generating the second authenticating dynamic password (for example, 01:03 on Jan. 1, 2000) and the initial time (00:00 on Jan. 1, 2000), and makes the difference minus the time offset (which equals to 2) to get the updated dynamic factor (equals to 61) and generates OTP2 according to the updated dynamic factor.

In the embodiment of the invention, because the dynamic factor is corrected in S803, the authentication server can generate the second authenticating dynamic password OTP2 according to the corrected dynamic factor; preferably, the OTP2 is one dynamic password.

It should be noted that if a dynamic password is generated based on counting time (the dynamic factor is a time factor), when the user side receives the OTP2 sent from the authentication server, the user needs to use the dynamic password token to generate a second dynamic password in regulated time. The reason is as the following:

The dynamic password token and the authentication server count time respectively. In the process of verification, the OTP2 generated by the authentication server is earlier than the second dynamic password generated by the dynamic password token. Therefore, a time factor for generating the OTP2 by the authenticating server is different from the time factor for generating the second dynamic password by the dynamic password token such that the dynamic passwords are different. The method for improvement as the following can be used. After the successful verification of the first dynamic password, the time is aligned in order to make the time of the dynamic password token and the time of the authentication server to be synchronous and the aligned time is used as base time and a time interval, such as 1 minute, is set as well. The time after extending one minute from the base time is used as the time factor to generate OTP2 (OTP2 is one dynamic password), that is, dynamic passwords generated in the 1 minute are identical. After the authentication server generates OTP2 and the authentication server returns OTP2 hack to the user side and the user uses the dynamic password token to generate the second dynamic password in regulated time which is less than 1 minute such that the second dynamic password generated by the dynamic password token and the second authenticating dynamic password generated by the authentication server should be identical.

In addition, the step can be in the following way: the authentication server generates OTP2 at regular time intervals and sends OTP2 back to the user side; preferably. The regular time interval can be longer than 0 and should be in safe category.

The following is an example of using 1 minute as the regular time interval:

When the authentication server receives the first dynamic password and verifies that the first dynamic password is correct, the time is set to be 0 minute. At the $1^{st}$ minute, generating OTP2 for the first time by using the method above according to the current counting time, preset initial time and counting time offset and sending OTP2 generated for the first time to the user side; then, at the $2^{nd}$ minute, generating OTP2 for the second time and sending OTP2 generated for the second time to the user side; at the $3^{rd}$ minute, generating OTP2 for the third time and sending the OTP2 generated for the third time to the user side, and so on. In this way, the problem caused by delay is avoided when the user receives or verifies OTP2. Preferably, when OTP2 is sent to the user side, the maximum times that the authentication server returns OTP2 back to the user side should be limited. For example, when OTP2 is retuned by the authentication server for 10 times and the user side performs no operation, the user side is notified that the time is out and the verification is failed.

When the user side receives OTP2, a second dynamic password is generated by using the dynamic password token; and the second dynamic password is compared with OTP2, if they are identical, the comparison is regarded to the successful and a third dynamic password generated by using the dynamic password token is sent to the authentication server. If the second dynamic password is different from OTP2, the comparison is regarded to be failed and the user can regard the authentication server to be illegitimate and stops operation of logon.

Preferably, in order to avoid that the time for generating the first OTP2 by the authentication server and the time for generating a first dynamic password (a correct first dynamic password) are so close that the first OTP2 is identical to the first dynamic password, for example, when the authentication server generates the first OTP2 at 0 minute (the counting time unit is 1 minute), the authentication server can generate a dynamic factor according to the next time of the current time and generate OTP2 for the first time according to the dynamic factor. In addition, there are other ways to prevent the time of generating OTP2 from being identical to the time of generating the first dynamic password. For example, waiting for 2 counting time units after the first dynamic password is verified to be correct and then generating OTP2 at the third counting time unit. In this way, the time of generating OTP2 is different from the time of generating the first dynamic password.

When the authentication server generates the second authenticating dynamic password, if the time interval between generating the second authenticating dynamic password and generating the first authenticating dynamic password is too short, the first authenticating dynamic password might be identical to the second authenticating dynamic password. In order to make the second authenticating dynamic password to be different from the first authenticating dynamic password, a preset step size can be added to the updated dynamic factor when the second authenticating dynamic password is generated, and then the second authenticating dynamic password is generated according to the dynamic factor with added step size so as to avoid the security vulnerability caused by that the second authenticating dynamic password and the first dynamic password are identical.

S805, whether the authentication server receives the third dynamic password in a predetermined time, if yes, go to S306; otherwise go to S309.

In the embodiment of the invention, the predetermined time is the valid time for receiving the third dynamic password. The authentication server verifies the third dynamic password which is received in the predetermined time and discards the third dynamic password which is not sent in the predetermined time and not to verify the third dynamic password. Thereby, to some great extent, limiting time can prevent the attack of the hacker.

S806, the authentication server generates a third authenticating dynamic password OTP3.

Preferably, the authentication server verifies whether the third dynamic password has been used before generating the third authenticating dynamic password.

It should be noted that, preferably, when the dynamic password is generated based on counting time, as description above, a time window exists for processing the dynamic factor. The following method can be used to solve the problem of repeat dynamic password calculation caused by the time window. An example is illustrated in the following:

For example, the time of generating OTP2 by the authentication server is 00:10(hour:minute) and the time of generating OTP3 by the authentication server is 00:13 (hour: minute); the time window is 3 minutes; because OTP3 is a set of dynamic passwords, the time factor is 00:13 (hour: minute)+3 minutes which includes the time factor 00:10 (hour:minute) calculated as a dynamic factor, which is meaningless and repeat calculation may cause security vulnerability. Therefore, when the OTP3 is calculated, a gate is set for a dynamic factor. The definition of the gate in the invention is that, a time before some exact time, even if the time is in some category of the time window, is not used as the dynamic factor for calculation by force. Obviously, in the embodiment of the invention, the time of 00:10 (hour:minute) and the time before 00:10 (hour:minute) can not be used as the dynamic factor.

When the authentication server generates the third authenticating dynamic password, if the time interval after generating the second authenticating dynamic password is too short, the third authenticating dynamic password might be identical to the second authenticating dynamic password. In order to make the third authenticating dynamic password to be different from the second authenticating dynamic password, the dynamic factor should be updated when the third authenticating dynamic password is generated. The method for generating the dynamic factor is same with the method for updating the dynamic factor the first authenticating dynamic password is generated; Then a preset step size is added to the updated dynamic factor; the third authenticating dynamic password is generated according to the dynamic factor with added step size so as to avoid the security vulnerability caused by that the third authenticating dynamic password and the second authenticating dynamic password are identical.

S807, The authentication server verifies the third dynamic password, if the third dynamic password is correct, go to S808; otherwise, go to S809.

In the embodiment of the invention, the method for authenticating the third dynamic password by the authentication server is that the authentication server compares OTP3 with the third dynamic password, if they are identical, the comparison is regarded to be successful and go to S308; if they are not identical, the comparison is regarded to be failed, go to S809.

Thereby, if the authentication server generates a set of authenticating dynamic passwords as OTP3 in S806, the comparison for the third dynamic password is in the following way: the authentication server compares the third dynamic password with the set of authenticating dynamic passwords generated in S806 one by one; if one authenticating dynamic password in the set of authenticating dynamic passwords is identical to the third dynamic password, the comparison is regarded to be successful, go to S808; if no dynamic password in the set of the authenticating dynamic passwords is identical to the third dynamic password, the comparison is regarded to be failed and the authentication is incorrect, go to S809.

In the embodiment of the invention, a process of verifying a static password can be added to prevent illegitimate logon caused by that the dynamic password token is lost or the dynamic password token has been stolen so as to make the logon process to be safer. Specifically, the authentication server receives the third dynamic password and the static password in a predetermined time and verifies the third dynamic password and the static password, if both of them are correct, go to S808; otherwise go to S809.

S808, The logon is success and the transaction online can be started.

S809, Error is returned.

In the embodiment of the invention, that error is returned includes the following cases:

When the authentication server determines that the first dynamic password is incorrect in S803, the error that the first dynamic password is incorrect is returned.

When the third dynamic password is not received in the predetermined time in S805, the error that the time for receiving the third dynamic password is out is returned.

When the authentication server determines that the third dynamic password is incorrect in S807, the error that the logon is failed is returned.

In the embodiment of the invention of the invention, the algorithms which can be used for generating a dynamic password include HMAC-SHA1, MD5, SHA-1 and SHA-256, etc. Thereby, the algorithm for generating OTP1 by the authentication server is identical to the algorithm for generating the first dynamic password by the dynamic password token; the algorithm for generating OTP2 by the authentication server is identical to the algorithm for generating the second dynamic password by the dynamic password token; the algorithm for generating OTP3 by the authentication server is identical to the algorithm for generating the third dynamic password by the dynamic password token.

It should be noted that the generation of OTP1, the first dynamic password, OTP2, the second dynamic password, OTP3 and the third dynamic password is based on event (as described in embodiment 4 of the invention) or time (as described in embodiment 5 of the invention).

According to the invention, after three tithes of password authentication, a dynamic password token can verify the legitimacy of a server, which enhances the security of the dynamic password authentication and avoids the loss caused by that the user logon the phishing website by mistake.

Embodiment 7

According to the embodiment of the invention, a device for verifying a dynamic password is provided.

Figure 9:
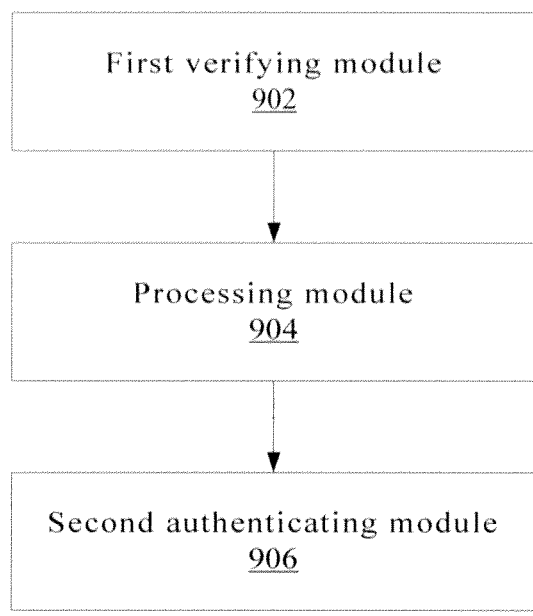
FIG. 9 is a structure block diagram of a dynamic password verification device provided by embodiment 4 of the invention.

FIG. 9 is a structure block diagram of a dynamic password verification device provided by the embodiment 4 of the invention. Referring to FIG. 9, the device includes a first verifying module 902 for verifying the first dynamic password from a user side; a processing module 904 for generating a second authenticating dynamic password after verifying that the first dynamic password is correct and sending the second authenticating dynamic password to the user side; a second authenticating module 906 for verifying a third dynamic password when receiving the third dynamic password from the user side in a predetermined time.

If the second verifying module 906 above verifies that the third dynamic password is correct, the second authenticating module 906 determines that logon of a user is successful.

Figure 10:
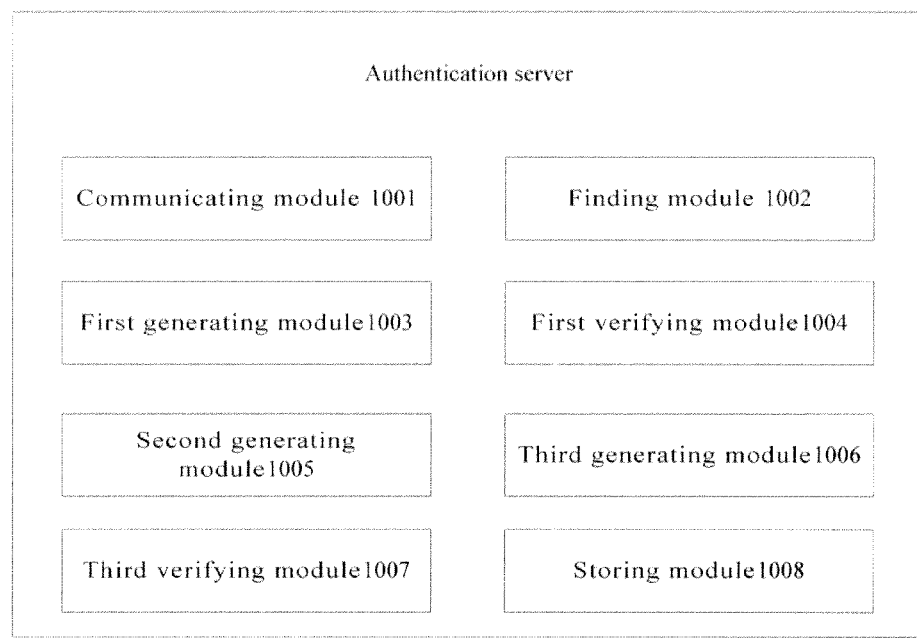
FIG. 10 is a preferred structure block diagram of a dynamic password verification device provided by embodiment 7 of the invention.

FIG. 10 is a preferable structure block diagram of a dynamic password verification device provided by the embodiment 7 of the invention. The device comprises a communicating module 1001, a finding module 1002, a first generating module 1003, a first verifying module 1004, a second generating module 1005, a third generating module 1006, a third verifying module 1007 and a storing module 1008, thereby the above modules can be realized via programs in a corresponding hardware. Thereby, in FIG. 9, the first verifying module 402 can comprise a finding module 1002, a first generating module 1003 and a first verifying module 1004; a processing module 404 can comprise a second generating module 1005: a second verifying module 406 can comprise the third generating module 1006 and the third verifying module 1007.

The communicating module 1001 is for communicating with the user side, receiving user name information and a first dynamic password sent from the user side, sending OTP2 to the user side, receiving the third dynamic password from the user side and returning logon result back to the user side.

The finding module 1002 is for, when receiving user name information and the first dynamic password sent from the user side, finding a dynamic password token number, a seed and a dynamic factor corresponding to the user name information.

The first generating module 1003 is for generating OTP1 according to the seed and the dynamic factor which are found by the finding module 1002.

The first verifying module 1004 is for verifying the first dynamic password sent from the user side. Here, the first verifying module 1004 further can align the dynamic factor after the first dynamic password is verified to be correct such that the second generating module 1005 generates OTP2 according to the aligned dynamic factor.

The second generating module 1005 is for generating OTP2 after the first authenticating module 1004 verifies that the first dynamic password is correct and sending the OTP2 to the user side by the communicating module 1001.

The third generating module 1006 is for generating OTP3 after the authentication server receives the third dynamic password sent from the user side in a predetermined time.

The third authenticating module 1007 is for verifying the third dynamic password sent from the user side; if the third dynamic password is verified to be correct, the logon is successful; otherwise, the logon is failed.

The storing module 1008 is for storing the user name information, the dynamic password token number, the seed and the dynamic factor.

Thereby, when the first generating module 1002 generates OTP1, the first generating module 1002 can generate one dynamic password or a set of dynamic passwords;

Correspondingly, when the first generating module 1002 generates one first dynamic password, that the first verifying module 1004 verifies the first dynamic password sent from the user side can be that the first verifying module 1004 compares the first dynamic password with the dynamic password generated by the first generating module 1002, if they are identical, the verification is successful; if they are not identical, the first dynamic password is verified to be incorrect;

When the first generating module 1002 generates a set of dynamic passwords, that the first authenticating module 1004 verifies the first dynamic password sent from the user side is that the first verifying module 1004 compares the first dynamic password with the set of dynamic passwords generated by the first generating module 1002 one by one, if one dynamic password in the set of dynamic passwords is identical to the first dynamic password, the comparison is regarded to be successful and the first dynamic password is verified to be correct; otherwise, the first dynamic password is incorrect;

Before the first verifying module 1003 generating the first dynamic password, the following step can be further comprised: the first verifying module 1003 determines whether the first dynamic password has been used, if the first dynamic password has not been used, the first verifying module 1003 determines whether the first dynamic password is correct; if the first dynamic password has been used, the verifying module returns error message back to the user side by the communicating module 1001;

After the first verifying module 1003 verifies that the first dynamic password is correct, a following step can be further included: aligning the dynamic factor.

The communicating module 1001 further can be for receiving a static password sent from the user side;

Correspondingly, the third verifying module 1007 verifying the third dynamic password sent from the user side further comprises verifying the static password sent from the user side, if both the third dynamic password and the static password has passed the verification, the verification is regarded to be successful; otherwise, the verification is failed;

The algorithms for generating OTP1 by the first generating module 1002 include HMAC-SHA1, MD5, SHA-1 and SHA-256;

Correspondingly, the algorithms for generating OTP2 by the second generating module 1005 include HMAC-SHA1, MD5, SHA-1 and SHA-256 the algorithms for generating OTP3 by the third generating module 1006 include HMAC-SHA1, MD5, SHA-1 and SHA-256;

According to the invention, after three times of password verification, the dynamic password token can verify the legitimacy of the server, which enhances the security of the dynamic password authentication and prevents the loss caused by that the user logon the phishing website by mistake.

Embodiment 8

Figure 11:
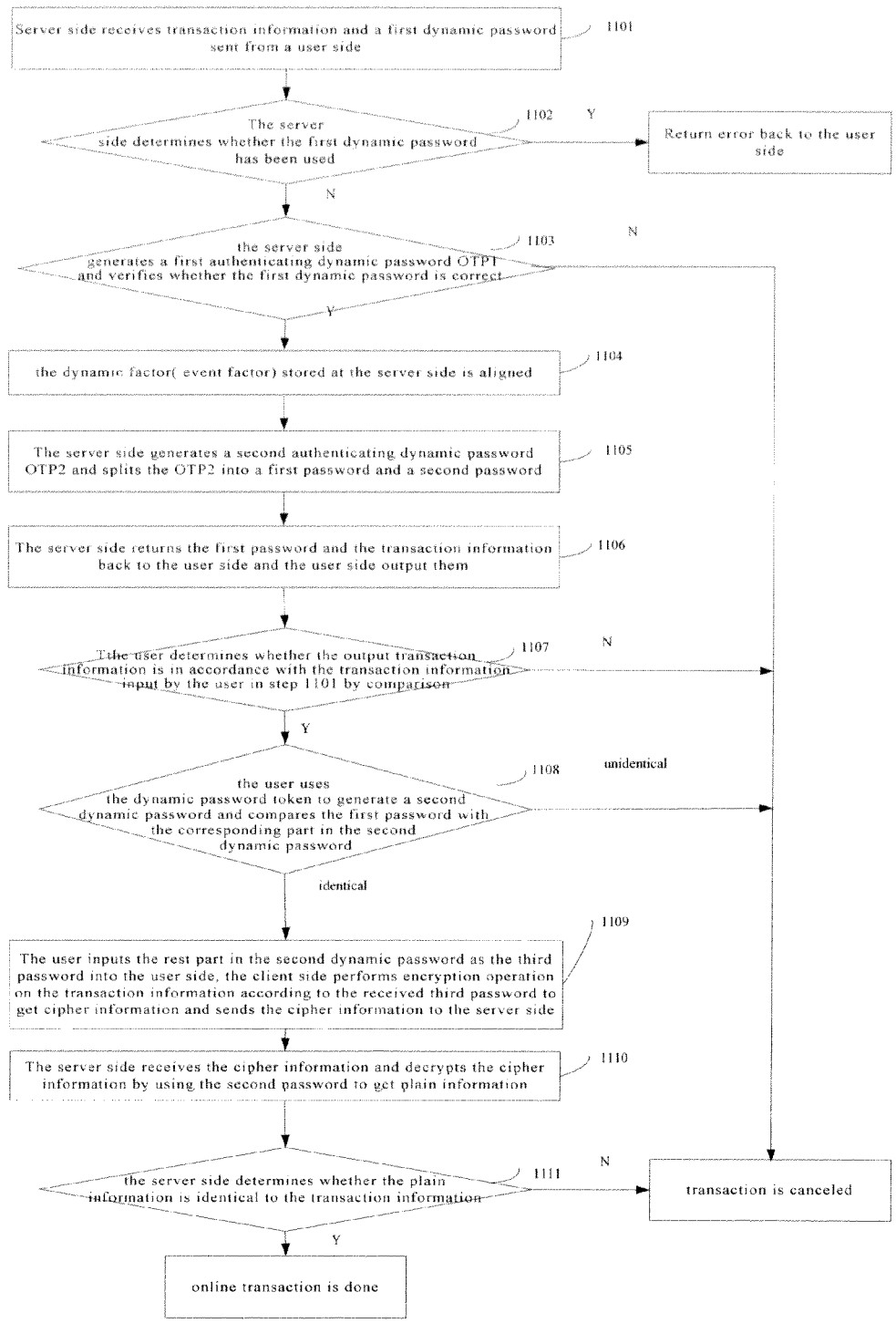
FIG. 11 is a flow chart illustrating a safe transaction method provided by embodiment 8 of the invention.

The embodiment of the invention provides a method of safe transaction. Referring to FIG. 11, the method includes the following steps.

Step 1101, the server side provides transaction information and a first dynamic password sent from a user side;

Thereby, the transaction information can include, but not limited to, a user account number, a user password, a transaction amount and a currency type, etc. The first dynamic password is generated by the dynamic password token held by a user of the user side.

Thereby, a dynamic password token used in the embodiment of the invention is arranged with a press button. A dynamic password generated when the user presses the button for the first time is the first dynamic password.

For the dynamic password token provided by the embodiment of the invention, it should be noted that the dynamic password token held by the user at the user side has been bonded with the user account of the user in advance. The dynamic password token has a unique number, stores inside a unique seed corresponding to the number and can generate a dynamic password according to an inbuilt dynamic password algorithm and the inbuilt dynamic password algorithm is identical to the algorithm for generating the dynamic password at the server side. The dynamic password token is an offline dynamic password generating device which has no physical connection with the user side. Data generated and displayed by the dynamic password token is input to the user side by the user who holds the dynamic password token legitimately.

For the dynamic password generated by the dynamic password token, it should be noted that the dynamic password can be generated by using dynamic factor such as time or event. In the embodiment of the invention, the dynamic password is generated by using the dynamic factor of event. Preferably, hereby the dynamic factor is counting times.

Step 1102, the server side determines whether the first dynamic password has been used;

If no, go to step 1103;

Otherwise, return error back to the user side.

It should be noted that step 1102 is an optional step.

Step 1103, the server side generates a first authenticating dynamic password OTP1 and verifies whether the first dynamic password is correct;

If yes, go to step 1104;

Otherwise, the transaction is canceled.

Thereby, the way of generating the first authenticating dynamic password OTP1 by the server side is identical to the way of generating the first dynamic password by the dynamic password token, e.g. the counting times is used as the dynamic factor, the seeds are identical and the algorithms are identical such as HMAC-SHA1, MD5, SHA-1 or SHA-2. It should be noted that the server side generates a first authenticating dynamic password OTP1 and OTP1 can be one dynamic password or a set of dynamic passwords.

Thereby, the process of verifying whether the first dynamic password is correct by the server side can include that when OTP1 is one dynamic password, the server side compares the first dynamic password with OTP1, if they are identical, the first dynamic password is regarded to be correct; otherwise, the first dynamic password is regarded to be incorrect;

When the server side uses a set of consecutive increasing dynamic factors to calculate OTP1. OTP1 includes a set of dynamic passwords, the server side compares the first dynamic password with the set of dynamic passwords one by one, if one dynamic password in OTP1 is identical to the first dynamic password, the verification is regarded to be successful and the first dynamic password is correct; if the first dynamic password is identical to none of the dynamic passwords in the OTP1, the verification is regarded to be failed and the first dynamic password is incorrect.

Step 1104, the dynamic factor stored at the server side is aligned;

The following is an example of generating the dynamic password by using a dynamic factor of counting times in the embodiment of the invention:

A dynamic password is generated by using dynamic factor of counting times, that is, the times of generating dynamic password by a device (the dynamic password token or the server side) is regarded as the dynamic factor when a dynamic password is generated. When a dynamic password is generated for the first time, the dynamic factor is count value of 1; when a dynamic password is generated for the second time, the dynamic factor is count value of 2, and so on; 1 (or a step size) is added to the count value after every time of generating a dynamic password. Because the dynamic password token and the server side count times independently, the counting times of them are not identical. Therefore, the value of counting times stored at the server side should be aligned.

If the dynamic factor used by the dynamic password token for generating the first dynamic password is count value of 100, at that time the dynamic factor stored at the server side is count value of 95. A floating range of count value is set to be 10 when the server side calculates OTP1. The server side calculates OTP1 by using the dynamic factor count value of 95, the floating range of the count value set at the server side for generating OTP1 is 10. The server side calculates OTP1 one by one from the count value of 95 as the dynamic factor to the count value of 95+10 as the dynamic factor. Whenever the server side generates an OTP1, the server side compares the OTP1 with the first dynamic password. If the OTP1 is not identical to the first dynamic password, the server side will go on calculating another OTP1 with an increased count value.

From what is described above, the server side generates at most 11 OTP1s based on the count values of 95, 96 . . . 104 and 105. The server side compares the first dynamic password with 11 OTP1s one by one. When the comparison made between the first authenticating dynamic password generated on the base of count value 100 and the first dynamic password by server side is successful, the first dynamic password is regarded to be correct and the calculation of OTP1 is stopped. And then the count values stored at the server side should be aligned, e.g. 100 is regarded as the correct count value, which keeps the synchronization between the count value of the dynamic password token and the count value of server side. The server side adds 1 (or a predetermined step size) to the count value of 100 and stores 101 as the dynamic factor for calculating the dynamic password next time. If none of 11 OTP1s above is identical to the first dynamic password, the first dynamic password is regarded to be incorrect.

Step 1105, the server side generates a second authenticating dynamic password OTP2 and splits the OTP2 into a first password and a second password according to a predetermined rule;

In the embodiment of the invention, if the dynamic factor is aligned in step 1104, the second authenticating dynamic password OTP2 generated by the server side is a single one.

The process that the server side splits the OTP2 into a first password and a second password can include that the server side takes a predetermined part of OTP2 as the first password and takes the rest part as the second password. In the embodiment of the invention, preferably, OTP2 is a number of 8 digits, the first three digits is taken as the first password and the rest five digits is taken as the second password.

Step 1106, the server side returns the first password and the transaction information hack to the user side and the user side outputs the first password and the transaction information;

Thereby, it should be noted that the ways for the user side to output the first password and the transaction information include, but not limited to, displaying or audio broadcasting, etc.

Step 1107, the user compares and determines whether the output transaction information is in accordance with the transaction information input by the user in step 1101;

If yes, go to step 1108;

Otherwise, the user cancels the transaction.

Step 1108, the user uses the dynamic password token to generate a second dynamic password and compares the first password with the corresponding part (for example, the first three digits) in the second dynamic password;

if they are identical, the comparison is successful, go to step 1109;

otherwise, the comparison is failed, the user can regard that the server side is incorrect and cancel the transaction.

It should be noted that the ways of comparison by the user and the rules for splitting the second authenticating dynamic password OTP2 by the server side are identical.

Step 1109, the user inputs the rest part (for example, the rest 5 digits) in the second dynamic password as the third password into the user side, the client side performs encryption operating on the transaction information according to the received third password to get cipher information and sends the cipher information to the server side;

Step 1110, the server side receives the cipher information and decrypts the cipher information by using the second password to get plain information;

The encryption and decryption algorithms used for encrypting and decrypting the transaction information by the client side and the server side are identical. For example, the algorithms include AES, RSA and 3DES.

Step 1111, the server side determines whether the plain information is identical to the transaction information received in step 1101;

If yes, online transaction is done;

If no, transaction is canceled.

The method for safe transaction provided by the embodiment of the invention, by the improvement of the server side, can makes a dynamic password token to verify the legitimacy of the server side and provide transaction signon function with the cooperation of the client side as well, which guarantees the security and the privacy of the transaction information and prevents the user identity from being attacked or counterfeited by the third party and prevents the transaction information from being fabricated or tampered, etc.

Embodiment 9

Figure 12:
FIG. 12 is a flow chart illustrating a safe transaction method provided by embodiment 9 of the invention.

The embodiment of the invention provides a method for safe transaction. Referring to FIG. 12, the method includes Step 1201, a server side receives transaction information and a first dynamic password sent from a client side;

Thereby, the transaction information can include, but not limited to, a user account, a user password, a transaction amount, a currency type. The first dynamic password is generated by a dynamic password token held by a user at the client side.

Thereby, the dynamic password token used in the embodiment of the invention is arranged with a press button. A dynamic password generated when the user presses the press button for the first time is the first dynamic password.

For the dynamic password token provided by the invention, it should be noted that the dynamic password token held by the user at the client side has been bonded with the user account of the user in advance. The dynamic password token has a unique number and a unique seed which is corresponding to the number. The dynamic password token can generate a dynamic password according an inbuilt dynamic password algorithm which is identical to the algorithm for generating a dynamic password at the server side. The dynamic password token is an offline dynamic password generating device and has no physical connection with the client side. Data generated and displayed by the dynamic password token is input into the client side by the user who holds the dynamic password token legitimately.

For the dynamic password token to generate a dynamic password, time or event can be used as a dynamic factor. In the embodiment of the invention, for example, time is used as dynamic factor for generating a dynamic password.

Step 1202, the server side determines whether the first dynamic password has been used;

If no, go to step 1203;

If yes, return error back to the client side.

It should be noted that step 1202 is an optional step.

Step 1203, the server side generates a first authenticating dynamic password OTP1 and verifies whether the first dynamic password is correct;

If yes, go to step 1204;

Otherwise, cancel the transaction.

Thereby, the way and the algorithm used by the server side to generate the first authenticating dynamic password OTP1 are identical to the way and the algorithm used by the dynamic password token to generate the first dynamic password; for example, the way is using time as the dynamic factor and the algorithm can be HMAC-SHA1, MD5, SHA-1 or SHA-2, etc. It should be noted that the first authenticating dynamic password OTP1 venerated by the server side can be a single one or a set of OTP1s.

Thereby, the process that the server side verifies whether the first dynamic password OTP1 is correct can include that when the OTP1 is a single one, the server side compares the first dynamic password with the OTP1, if they are identical, the first dynamic password is regarded to be correct; if they are not identical, the first dynamic password is regarded to be incorrect;

When the server side uses a set of consecutive increasing dynamic factors to calculate OTP1, a set of OTP1s are generated. Then the server side compares the first dynamic password with the set of OTP1s. If the first dynamic password is identical to one authenticating dynamic password in the set of OTP1s, the verification is regarded to be successful and the first dynamic password is correct; if the first dynamic password is identical to none of the authenticating dynamic passwords in the set of OTP1s, the verification is regarded to be failed and the first dynamic password is incorrect.

Step 1204, aligning the dynamic factor stored at the server side.

Specifically, in the process of generating the dynamic password by using counting time as the dynamic factor, aligning the dynamic factor stored at the server side can include that the dynamic factor of the OTP1 which successfully verifies the first dynamic password, is used as a standard dynamic factor; the server side uses the standard dynamic factor minus the current dynamic factor to get an offset value of the current dynamic factor;

the server side adds the current dynamic factor to the offset value so as to get the aligned dynamic factor.

The following gives an example of using counting time as dynamic factor to generate dynamic password in the embodiment of the invention:

A dynamic password is generated by using counting time, e.g. the dynamic password is generated by using the time of generating a dynamic password as the dynamic factor by a device, such as a dynamic password token or the server side. An example of generating dynamic password by using a dynamic factor of 1 minute as counting time unit is given in the embodiment of the invention. Generally, the dynamic password token sets an initial time at the time of initializing, for example, 00:00 (hour:minute) on Jan. 1, 2000. When the dynamic password is generated at 01:00 (hour:minute) on Jan. 1, 2000, the dynamic password token or the server side uses the time of 01:00 (hour:minute) on Jan. 1, 2000 minus the initial time of 00:00 (hour:minute) on Jan. 1, 2000 to get 60 minutes and uses 60 as the dynamic factor to generate a dynamic password. However, because the dynamic password token and the server side count time respectively, asynchronous of counting time between them happens often. Therefore, the dynamic factor at the server side should be aligned. The method of aligning is as the following:

The initial time of the dynamic password token and the server side is set to be 00:00(hour:minute), Jan. 1, 2000. The dynamic password token generates a dynamic password at 01:00(hour:minute), Jan. 1, 2000. At that time, the dynamic factor used by the dynamic password token is 60. However, because of the error of counting time and data transmission, the base time of the server side is 01:02(hour:minute) on Jan. 1, 2000, that is, the dynamic factor is 62 when the server side generates OTP1. A floating range of time, such as ±3 minutes, is set for the server side when the server side generates a dynamic password. The floating range is called time window in the embodiment of the invention. A set of at most 7 OTP1s is generated by using 62±3. That is, the dynamic factors used by the server side are 59, 60, 61, 62, 63, 64 and 65. Comparing the OTP1s generated according to the dynamic factors one by one with the first dynamic password. When the comparison with the OTP1 generated by using the first dynamic factor 59 is not successful, comparing the OTP1 generated by using the next dynamic factor 60 with the first dynamic password. Apparently, when the dynamic factor is 60, the first dynamic password is verified to be correct. Therefore, a correct dynamic factor is obtained and the dynamic factor is updated to be 60 and the counting time offset between the server side and the dynamic password token is −2 minutes. For the next time of calculating a dynamic password, the offset value is added to an obtained system time of the server side so as to make the time synchronized with the dynamic password to be taken as the base time. Thereby, the base time is the sum of the time of the system of the server side and the counting time offset and can become the counting time after synchronizing with the dynamic password token as well.

It should be noted that, when a dynamic password is generated by using counting time, the dynamic password can be calculated by using a dynamic factor in counting time unit of 1 minute or 30 seconds. The embodiment of the invention described above is an example of calculating a dynamic password in counting time of 1 minute. In specific application, the regulation of the time unit of the dynamic factor can be determined by the security and the calculation precision.

Step 1205, the server side generates a second authenticating dynamic password OTP2 and the OTP2 is split into a first password and a second password;

In the embodiment of the invention, if the dynamic factor of the server side is aligned in step 1204, the second authenticating dynamic password OTP2 generated by the server side is a single one.

The process that the server side splits OTP2 into a first password and a second password according a predetermined rule can includes that the server side takes a predetermined part in OTP2 as the first password and takes the rest part as the second password. In the embodiment of the invention, preferably, OTP2 is a number with 8 digits and the first three digits are taken as the first password and the last five digits are taken as the second password.

When the server side generates OTP2, it should be noted that OTP2 should not be identical to OTP1 so as to avoid the security vulnerability caused by that the OTP2 is identical to OTP1 because the time of generating OTP2 is too close to the time of generating OTP1. If the case that generating time between them is too close happens, a step size is added to the time factor to generate OTP2 so as to avoid that OTP2 and OTP1 are identical.

Thereby, in order to avoid failed verification caused by network delay in the next step that the server side returns the first password back to the client side, that the server side generates the second authenticating dynamic password OTP2 further includes a method that the second authenticating dynamic password OTP2 is a set of passwords generated by the server side. For example, in step 1204, after the dynamic factor is aligned, the time offset is determined to be −2 minutes. Therefore the time of generating OTP2 equals to the synchronized time of server side plus a step size, e.g. 01:00 (hour:minute), Jan. 1, 2000 plus 1 minute, and the dynamic factor is 61. In order to generate a set of dynamic passwords, a time window of +5 is added. That is, 6 OTP2 are generated by using 61, 62, 63, 64, 65 and 66. If a set of 6 OTP2s are generated according to the above method, every OTP2 of the 6 OTP2s should be split into a first password and a second password so as to get 6 sets of first passwords and second passwords. The way of splitting is identical to the splitting method described above and no more detail is given here.

Step 1206: the server side returns the first password and the transaction information back to the client side and the client side outputs the first password and the transaction information;

Thereby, it should be noted that the way that the client side outputs the first password and the transaction information includes, but not limited to, displaying and audio broadcasting, etc.

Step 1207, the user compares the output transaction information and the transaction information input by the user in step 1201 and determines whether they are identical;

If yes, go to step 1208;

If no, the user cancels the transaction.

Step 1208, the user uses the dynamic password token to generate a second dynamic password and compares the first password with a corresponding part (for example, the first three digits) in the second dynamic password;

If they are identical, the comparison is successful, go to step 1209;

Otherwise, the comparison is failed and the user can regard that the server side is illegitimate and cancel the transaction.

Thereby, it should be noted that when the dynamic password is generated by using counting time (e.g. time factor is used as the dynamic factor) and the user receives the first password sent from the server side, the user should use the dynamic password token to generate the second dynamic password in regulated time. The reason is as the following.

The dynamic password token and the server side count time respectively. In the process of verification, the server side generates OTP2 before the dynamic password token generates a second dynamic password. Therefore, the time factor used by the server side for generating OTP2 is different from the time factor used by the dynamic password token for generating the second dynamic password, which causes that the dynamic passwords are different so as to result in failed comparison. Therefore, an improved method as the following should be used. After successful comparison of the first dynamic password at the server side, time is aligned in order to make time of the dynamic password token and the time of the server side to be synchronized and the aligned time is used as base time and a time interval, such as 1 minute, is set. The based time and a time obtained by extending 1 minute from the base time are used as dynamic factors for generating the second authenticating password OTP2 and the second authenticating password OTP2 is a single one, that is, dynamic passwords generated in the one minute are identical. The server side generates OTP2 and returns the OTP2 back to the client side and the user at the client side should use the dynamic password token to generate the second dynamic password in regulated time. If the time for generating the second dynamic password by using the dynamic password token is less than 1 minute, the second dynamic password generated by the dynamic password token and the OTP2 are identical.

In addition, the step can be performed in the following way. The server side generates an OTP2 at regular time intervals and returns the OTP2 back to the client side. The embodiment of the invention takes an example of 1 minute as the regular time interval. When the server side receives the first dynamic password and verifies that the first dynamic password is correct, the server side sets the time to be 0 minute and the OTP2 is generated at that time. Preferably, in order to avoid that the first OTP1 generated by the server side is identical to the first dynamic password generated by the dynamic password token by the user because the generating time of the them are too close, when the server side generates the first one of OTP2, the next minute of the current time is used as dynamic factor to generate the OTP2 for the first time and generates an OTP2 in every minute afterwards to prevent the delay of receiving or verifying OTP2 by the client side. Thereby, the dynamic passwords generated by the server side and the dynamic password token in the same minute are identical so that a second in the middle of the minute can be used as the dynamic factor or any second in the minute can be used as the dynamic factor. When the OTP2 is returned, the times for the server side to return the OTP2 should be limited to a maximum number of times. For example, if the OTP2s are returned back to the client side for ten times and the user performs no responding operation, the user will be informed that the time is out and the verification is failed. The fixed time should be longer than 0 and in the safe range.

In step 1208, when the server side generates a set of second authenticating passwords OTP2, the server side sends the plurality of the first passwords obtained by splitting. Then the user compares the first authenticating dynamic password displayed by the token with the plurality of the first passwords one by one, if the first authenticating dynamic password is identical to one of the first passwords, the comparison is success and the user can regard that the comparison is successful.

Step 1209, the user takes a corresponding part (such as the last five digits) in the second dynamic password as the third password to enter into the client side, the client side performs encryption operation on the transaction information according to the received third password to get the cipher information and sends the cipher information to the server side;

Step 1210, the server side receives the cipher information and decrypts the cipher information by using the second password to obtain the plain text information;

The encryption and decryption algorithms, such as AES, RSA and 3DES, used at the client side and the server side are identical.

Step 1211, the server side determines whether the plain information is identical to the transaction information received in step 1201;

If yes, online transaction is performed;

If no, the transaction is canceled.

When the server side generates a set of plurality of the second authenticating dynamic passwords OTP2, the server side uses the plurality of second passwords obtained by splitting to decrypt the cipher information to obtain a set of plain information; the server side compares the transaction information with the set of plain information, if one piece of plain text is identical to the transaction information, the online transaction is performed and if none piece of the plain text information is in accordance with the transaction information, the transaction is canceled.

The method for safe transaction provided by the embodiment of the invention, by the improvement of the server side, can make a dynamic password token to verify the legitimacy of the server side and provide transaction signature function with the cooperation of the user side as well, which guarantees the security and the privacy of the transaction information and prevents the user identity from being attacked or counterfeited by the third party and prevents the transaction information from being fabricated or tampered, etc.

Embodiment 10

Figure 13:
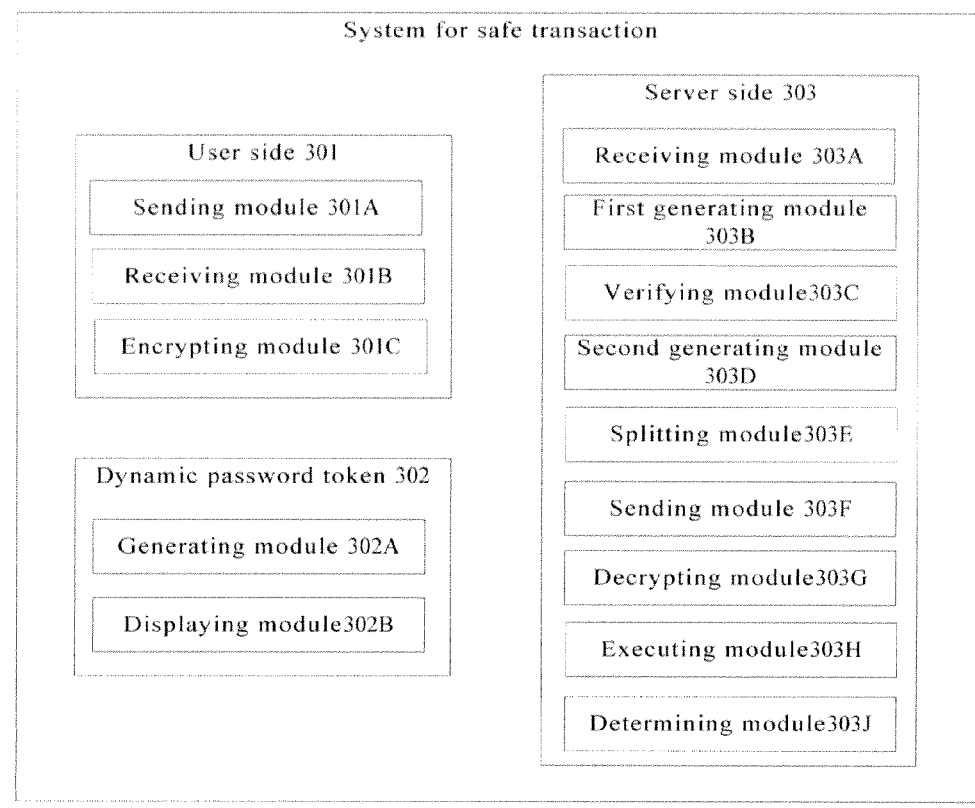
FIG. 13 is a structure schematic diagram illustrating a safe transaction system provided by embodiment 10 of the invention.

Referring to FIG. 13, the embodiment of the invention provides a system for safe transaction, which includes a user side 301, a dynamic password token 302 and a server side 303;

The dynamic password token 32 includes a generating module 302A for generating a first dynamic password and a second dynamic password;

a displaying module 302B for displaying the first dynamic password and the second dynamic password generated by the generating module 302A to a user;

The client side 301 includes a sending module 301A for sending transaction information input by the user, the first dynamic password generated by the generating module of the dynamic password token 302 and cipher information obtained by encrypting the transaction information by the encrypting module 301C to the server side 303;

a receiving module 301B for receiving a first password and transaction information sent from a sending module 303F of the server side 303, a third password input by the user and confirming information that the user determined that the first password are in accordance with corresponding data in the second dynamic password generated by the generating module 302A of the dynamic password token 302;

an encrypting module 301C for, after the receiving module 301B of the client side 301 receiving the confirming information that the first password is in accordance with the corresponding data in the second dynamic password, encrypting the transaction information with a third password received by the receiving module 30113 of the client side to get cipher information;

The server side includes a receiving module 303A for receiving the transaction information and the first dynamic password sent from the sending module 301A of the client side 301 and the cipher information sent from the client side 301;

a first generating module 30313 for generating the first authenticating dynamic password according to the transaction information received by the receiving module 303A of the server side 303;

a verifying module 303C for verifying the first dynamic password received by the receiving module by using the first authenticating dynamic password generated by the first generating module 303B;

a second generating module 303D for generating a second authenticating dynamic password after the first dynamic password passed the verification of the verifying module 303C;

a splitting module 303E for splitting the second authenticating dynamic password generated by the second generating module 303D into a first password and a second password;

a sending module 303F for returning the first password obtained by the splitting module 303E and the transaction information received by the receiving module 303A back to the client side 301;

a decrypting module 303G for decrypting the cipher information received by the receiving module 303A of the server side by using the second password obtained by the splitting module 303E to get plain information;

an executing module 303H for comparing the plain information obtained by the decrypting module 303G with the transaction information received by the receiving module 303A of the server side and determining whether they are identical, if yes, performing the transaction; if no, refusing the transaction.

The server side 303 further includes a determining module 303J for determining whether the first dynamic password received by the receiving module 303A of the server side 303 has been used;

If yes, the sending module urns an error report back to the client side 301;

if no, the first generating module 30313 of the server side 303 generates the authenticating dynamic password according to the transaction information received by the receiving module 303A of the server side 303.

Thereby, the first generating module 303B of the server side 303 specifically includes a finding unit for finding a corresponding seed and a dynamic factor according to a user account in the transaction information;

a generating unit for generating a first authenticating dynamic password according to the seed and the dynamic factor found by the finding unit, the first authenticating dynamic password is a single one or a set of dynamic passwords.

Thereby, the dynamic factor is based on time or event.

The authenticating module 303C of the server side 303 specifically includes a comparing unit for comparing the first dynamic password with the first authenticating dynamic password generated by the first generating module and determining whether they are identical;

a determining unit for, when the first authenticating dynamic password is one dynamic password, determining that the first dynamic password passes the verification if the comparing unit compares that the first dynamic password and the first authenticating dynamic password are identical, or determining that first dynamic password fails the verification if the comparing unit compares that the first dynamic password and the first authenticating dynamic password are not identical;

when the first authenticating dynamic password is a set of dynamic passwords, determining that the first dynamic password passes the verification of the server side if the comparison result of the comparing unit has the result that one of the first dynamic passwords and the first password are identical, or determining that the first dynamic password fails the verification of the server side if the comparison result of the comparing unit is that none of the first authenticating dynamic passwords is identical to the first password.

The server side 303 further includes an aligned module 303K for aligning a dynamic factor of the server side 303 after the first dynamic password passes the verification of the authenticating module 303C of the server side 303;

Correspondingly, the second generating module 303D of the server side 303 specifically is for using the seed and the aligned dynamic factor to generate the second authenticating dynamic password.

When the dynamic factor is based on time, after the server side 303 verifies that the first dynamic password has passed the verification, the second generating module 303D generates a single dynamic password or a set of dynamic passwords as the second authenticating dynamic password;

Correspondingly, when the second authenticating dynamic password generated by the second generating module 303D is a single dynamic password, the first password obtained by the splitting module 303E is a single password;

When the second authenticating dynamic password generated by the second generating module 303D is a set of dynamic passwords, the first password obtained by the splitting module 303E is a set of passwords.

Correspondingly, the sending module 303F of the server side 303 is for, when the first password obtained by the splitting module 303E is a single password, the first password and the transaction information is returned back to the client side 301 so as to compare with the currently returned first password;

When the first password is a set of passwords obtained by the splitting module 303E, the set of passwords and the transaction information is returned back to the client side 301 so as to compare with the first password.

Thereby, the algorithms for generating the first dynamic password, the second dynamic password and the first authenticating dynamic password and the second authenticating dynamic password are identical.

Thereby, the algorithms of the encryption and decryption are identical to the algorithm predetermined by the client side 301 and the server side 303.

The method for safe transaction provided by the embodiment, by the improvement of the server side, can make a dynamic password token to verify the legitimacy of the server side and provide transaction signature function with the cooperation of the client side as well, which guarantees the security and the privacy of the transaction information and prevents the user identity from being attacked or counterfeited by the third party and prevents the transaction information from being fabricated or tampered, etc.

Embodiment 11

Figure 14:
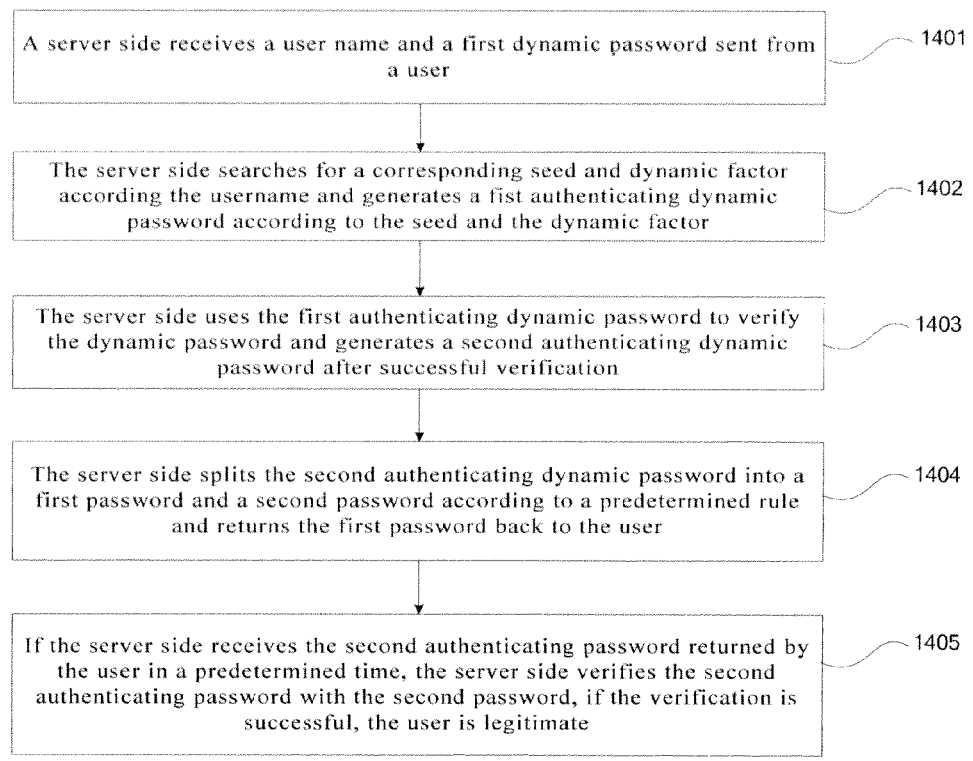
FIG. 14 is a flow chart illustrating a verification method on the basis of dynamic password provided by embodiment 11 of the invention.

The embodiment of the invention provides a method for authenticating a dynamic password. Referring to FIG. 14, the method includes step 1401, a server side receives a user name and a first dynamic password sent from a user;

Thereby, the first dynamic password generated by the dynamic password token used by the user and the dynamic password token is associated with the user name of the user. The dynamic password token has a unique number. The number, the seed and the algorithm which are used for generating dynamic password are pre-stored at the server side and associated with the user name of the user.

Thereby, the user name can be the identity card number of the user or the email of the user or the bank account of the user. Any information which can identify the identity of the user can be used as the user name of the user;

Step 1402, the server side searches for a corresponding seed and dynamic factor according the username and generates a first authenticating dynamic password according to the seed and the dynamic factor;

Step 1402, the server side uses the first authenticating dynamic password to verify the dynamic password and generates a second authenticating dynamic password after successful verification;

Step 1404, the server side splitting the second authenticating dynamic password into a first password and a second password according to a predetermined rule and returns the first password back to the user;

Specifically, the server side sends the first password to the client side, the client side outputs the first password by displaying or audio broadcasting; the user uses the dynamic password token to generate a second dynamic password upon receiving the first password and splits the second dynamic password into a first authenticating password and a second authenticating password according to the predetermined rule;

After the user uses the first authenticating password to verify the first password successfully, the server side is confirmed to be legitimate; the client side receives the second authenticating password input by the user and forwards the second authenticating password to the server side.

Step 1405, if the server side receives the second authenticating password returned by the user in a predetermined time, the server side verifies the second authenticating password with the second password, if the verification is successful, the user is legitimate.

If the server side is a phishing website, when the user uses the first authenticating password to verify the first password returned by the server side, the verification will be failed. At that time, the user will not return the second authenticating password back to the server side such that the server side can not get the second authenticating password above; even if the server side passes itself off as the user and uses the user name and the first dynamic password which are intercepted in step 1401 to access a real website, the server side can not provide the second authenticating password to the real website; further the real website refuses the server side to log on so as to guarantee the benefit of the user; by using the method that the server side splits the second authenticating dynamic password into a first password and a second password, the times of generating a dynamic password by the server side and the client side can be reduced so as to simplify the verification process on the premise of security.

In the embodiment of the invention, the server side splits a generated dynamic password into two passwords and sends one password to the user for the user to verify whether the server side is legitimate; the server side uses another password to verify whether the user is legitimate which prevents a malicious website, such as an phishing website, from logging on by using an intercepted password, which enhances the security of the system and guarantees the safety of the information of the user.

Embodiment 12

Figure 15:
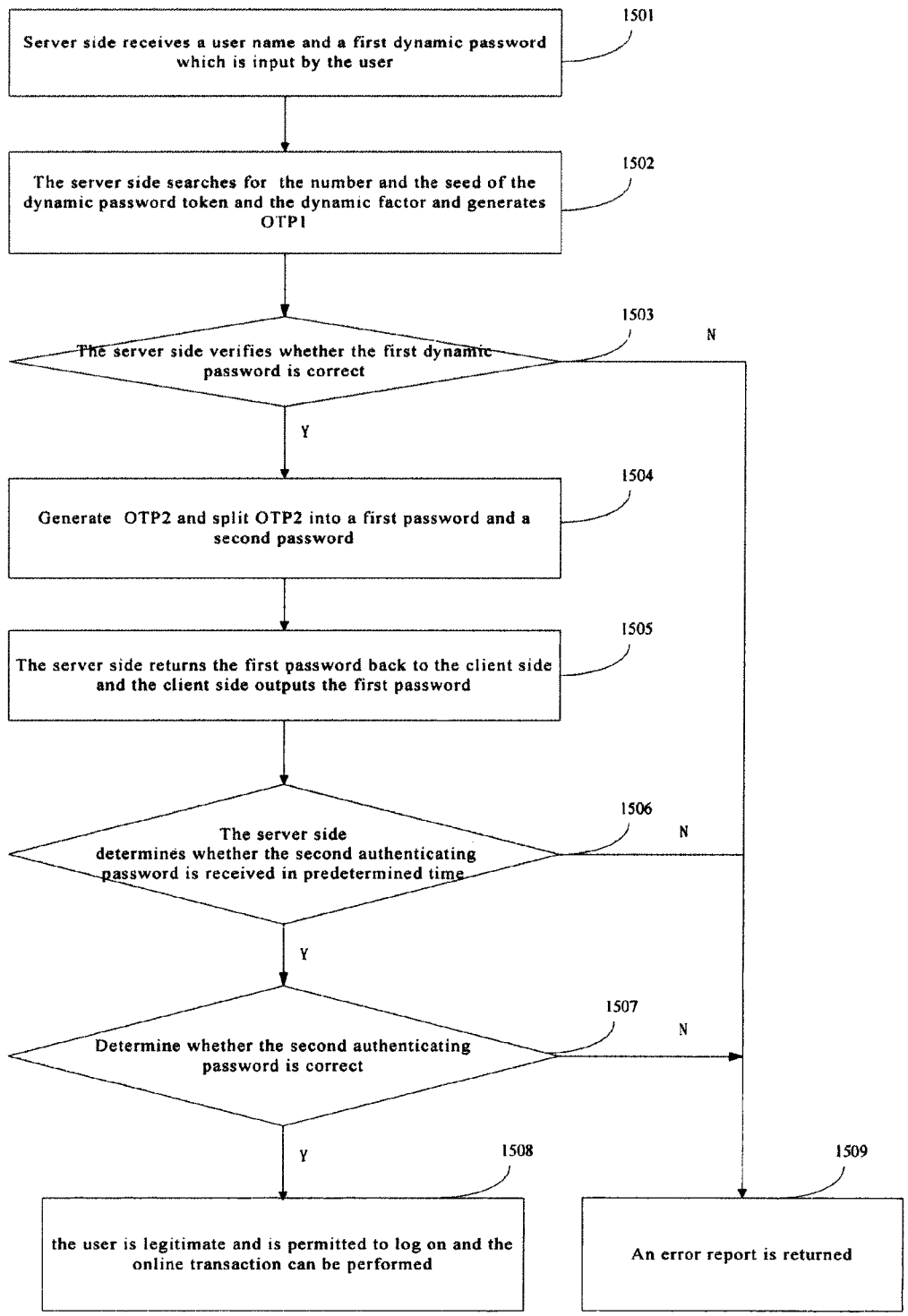
FIG. 15 is a flow chart illustrating a verification method on the basis of dynamic password provided by embodiment 12 of the invention.

The embodiment of the invention provides a method for verifying a dynamic password. By an example of logging on e-bank via dynamic password verification, the embodiment of the invention gives detailed illustration of verifying a dynamic password at a server side in the process of logging on e-bank by a user. Thereby, an example of counting times used in generating a dynamic password is taken in the embodiment of the invention. Referring to FIG. 15, the method includes:

Step 1501, the server side receives a user name and a first dynamic password which is input by the user;

In the embodiment of the invention, before starting the logon and verification process, a dynamic password token held by the user has been bonded with the user name of the user; the dynamic password token has a unique number and a unique seed corresponding to the number is stored in the server side; the dynamic password token can generate a dynamic password according to an inbuilt dynamic password algorithm; the dynamic password algorithm is identical to the algorithm for generating the dynamic password at the server side;

In the embodiment of the invention, the dynamic password token is arranged with a press button. A dynamic password generated by the user by pressing the press button for the first time is a first dynamic password;

The user inputs the user name and the first dynamic password by the client side and the user name and the first dynamic password are sent to the server side by the client side;

When a dynamic password is generated, a dynamic factor can be chosen to be based on time or event. In the embodiment of the invention, the dynamic password is generated based on event. Preferably, the method of using counting times is adapted in the embodiment of the invention; the counting times refers to the times of generating dynamic passwords.

Step 1502, the server side searches for the number and the seed of the dynamic password token and the dynamic factor and generates a first authenticating dynamic password OTP1 according to the found seed and the dynamic factor;

Thereby, the algorithm for the server side to generate OTP1 is identical to the algorithm for the dynamic password token to generate the first dynamic password; the dynamic passwords are generated with same algorithms and based on counting times; thereby, the algorithm can be HMAC-SHA1, MD5, SHA-1 or SHA-2, etc.

Step 1503, the server side verifies whether the first dynamic password is correct; if yes, go to step 1504; if no, go step 1509;

Thereby, in Step 1502, the server side can generate a single dynamic password or a set of dynamic passwords as OTP1; that is, OTP1 can be a set of dynamic passwords which are calculated out by using a set of consecutive increasing dynamic factors;

According to the number of the dynamic passwords in OTP1, the methods for verifying the first dynamic password by the server side are different. The following is the details.

When OTP1 is single dynamic password, the server side compares the first dynamic password with OTP1; if they are identical, the first dynamic password is regarded to be correct; if they are not identical, the first dynamic password is regarded to be incorrect;

When OTP1 is a set of dynamic passwords, the server side compares the first dynamic password with every dynamic password in the set of dynamic passwords respectively; when one dynamic password in the OTP1 is identical to the first dynamic password, the comparison is regarded to be correct and the first dynamic password is correct; if none of the passwords in OTP1 is correct with the first dynamic password, the verification is regarded to be failed and the first dynamic password is incorrect;

Before the server side verifies whether the first dynamic password is correct, the method further includes that The server side determines whether the first dynamic password has been used before; if the first dynamic password has not been used, the server side verifies whether the first dynamic password is correct; if the first dynamic password has been used, error report is returned back to the user;

When the server side verifies that the first dynamic password is correct, the method further includes aligning the dynamic factor stored at the server side (that is, updating the dynamic factor). An example of generating a dynamic password by using counting times taken in the embodiment of the invention is as the following so as to describe a process of aligning the dynamic factor:

generating a dynamic password by using counting times, that is, when generating the dynamic password, the times value of generating dynamic passwords by a device (the dynamic password token or the server side) is used as dynamic factor. When a dynamic password is generated for the first time, the dynamic factor is count value of 1; when a dynamic password is generated for the second time, the dynamic factor is count value of 2; and so on; every time of generating a dynamic password, 1 or a predetermined step size is added to the count value. Because the dynamic password token and the server side count times respectively, the values of counting times between not in accordance with each other, therefore, the count value stored at the server side needs to be aligned.

If the dynamic factor used by the dynamic password token for generating the dynamic password is count value of 100, the dynamic factor stored at the server side is count value of 95 at that time and the floating range of count value is set to be 10 when the server side calculates OTP1, the server side uses count value of 95 as the dynamic factor to calculate OTP1; the server side calculates OTP1 one by one from the count value of 95 as the dynamic factor to the count value of 95+10 as the dynamic factor. Whenever the server side generates an OTP1, the server side compares the OTP1 with the first dynamic password. If the OTP1 is not identical to the first dynamic password, the server side will go on calculating another OTP1 with an increased count value. From what is described above, the server side generates a set at most 11 OTP1s based on the count values from 95, 96 . . . 104 and 105. The server side compares the first dynamic password with the 11 OTP1s one by one. When the comparison made between the first authenticating dynamic password generated on the base of count value 100 and the first dynamic password by server side is successful, the first dynamic password is regarded to be correct and the calculation of OTP1 is stopped. And then the count value stored at the server side should be aligned, e.g. 100 is regarded as the correct count value, which keeps the synchronization between the count value of the dynamic password token and the count value of server side. The server side adds 1 (or a predetermined step size) to the count value of 100 and stores 101 as the dynamic factor for calculating the dynamic password next time. If none of 11 OTP1s above is identical to the first dynamic password, the first dynamic password is regarded to be incorrect.

Step 1504, the server side generates a second authenticating dynamic password OTP2 and splits OTP2 into a first password and a second password;

In the embodiment of the invention, because the dynamic factor is aligned in step 1503, therefore, the second authenticating dynamic password OTP2 generated by the server side is one dynamic password, that is, the dynamic password is different from OTP1.

That the server side splits OTP2 into a first password and a second password specifically includes that the server side takes a predetermined part in OTP2 as the first password and the rest part as the second password;

In the embodiment of the invention, preferably, the OTP2 is a number of 8 digits, the first three digits are taken as the first password and the last five digits are taken as the second password;

Step 1505, the server side returns the first password back to the client side and the client side outputs the first password;

When the client side receives the first password, the user uses the dynamic password token to generate the second dynamic password; the user splits the second dynamic password into a first authenticating password and a second authenticating password. The splitting rule of the embodiment of the invention is identical to the splitting rule of the server side in step 1504. The splitting rule is predetermined by the consultation between the server side and the user. Therefore, the user of the embodiment of the invention takes the first three digits in the second dynamic password as the first authenticating password and takes the last five digits as the second authenticating password.

The user compares the first password with the first authenticating password, if they are identical, the comparison is regarded to be successful and the second authenticating password is sent to the server side; if they are not identical, the comparison is regarded to be failed and the user can regard the server side to be illegitimate and the logon operation is stopped;

Step 1506, the server side determines whether the second authenticating password is received in predetermined time, if yes, go to step 1507; otherwise, go to step 1509;

In the embodiment of the invention, the predetermined time is the valid time for the server side to receive the second authenticating password. The server side verifies the second authenticating password received in valid time and discards and do not verify the second authenticating password which is not received in valid time. To some extent, the limitation of time can prevent an attack from a hacker.

Step 1507, the server side verifies the second authenticating password, if the second authenticating password is correct, go to step 1508; if the second authenticating password is incorrect, go to step 1509;

In the embodiment of the invention, that the server side verifies the second authenticating password is that the server side uses the second password to compare with the second authenticating password; if they are identical, the comparison is regarded to be success, go to step 1508; if they are not identical, the comparison is regarded to be failed, go to step 1509;

In the embodiment of the invention, a process of verifying a static password can be added so as to prevent an illegitimate user logon which is caused by loss of a dynamic password token or a dynamic password token being stolen. Specifically, the server side receives the second authenticating password and a static password sent from the user in a predetermined time; the server side verifies the static password and the second authenticating password respectively; if both of them are correct, go to step 1508; otherwise, go to step 1509.

Step 1508, the user is legitimate and is permitted to log on and the online transaction can be started;

Step 1509, an error report is returned;

In the embodiment of the invention, that an error report is returned can include the following situation.

In step 1503, the server side returns the report that the first dynamic password is wrong and the report indicates the information that the dynamic password token is illegitimate or the error of the dynamic factor is too large;

In step 1505, when the second authenticating password is received in a predetermined time, the report that the time for receiving the second authenticating password is out;

In step 1507, when the server side determines that the second authenticating password is incorrect, a report that logon is failed is returned.

In the embodiment of the invention, the following algorithms can be used for generating a dynamic password: HMAC-SHA1, MD5, SHA-1 or SHA-2. Thereby, the algorithm of generating OTP1 by the server side and algorithm of generating the first dynamic password by the dynamic password token are identical; the algorithm of generating OTP2 by the server side and the algorithm of generating the second dynamic password by the dynamic password token are identical.

In the embodiment of the invention, the server side generates a dynamic factor by counting times, generates a dynamic password on the basis of the dynamic factor and splits a generated dynamic password into two passwords. The server side sends one password to the user for the user to verify whether the server side is legitimate; the server side uses another password to verify whether the user is legitimate which prevents a malicious website, such as a phishing website, from logging on by using an intercepted password, which enhances the security of the system and guarantees the safety of the information of the user. Meanwhile, in the embodiment of the invention, with the improvement of the server side, the user can use a dynamic password token to verify the legitimacy of the server side, which prevents the user from loss caused by that the user loges on a phishing website and enhances the security of the dynamic password.

Embodiment 13

Figure 16:
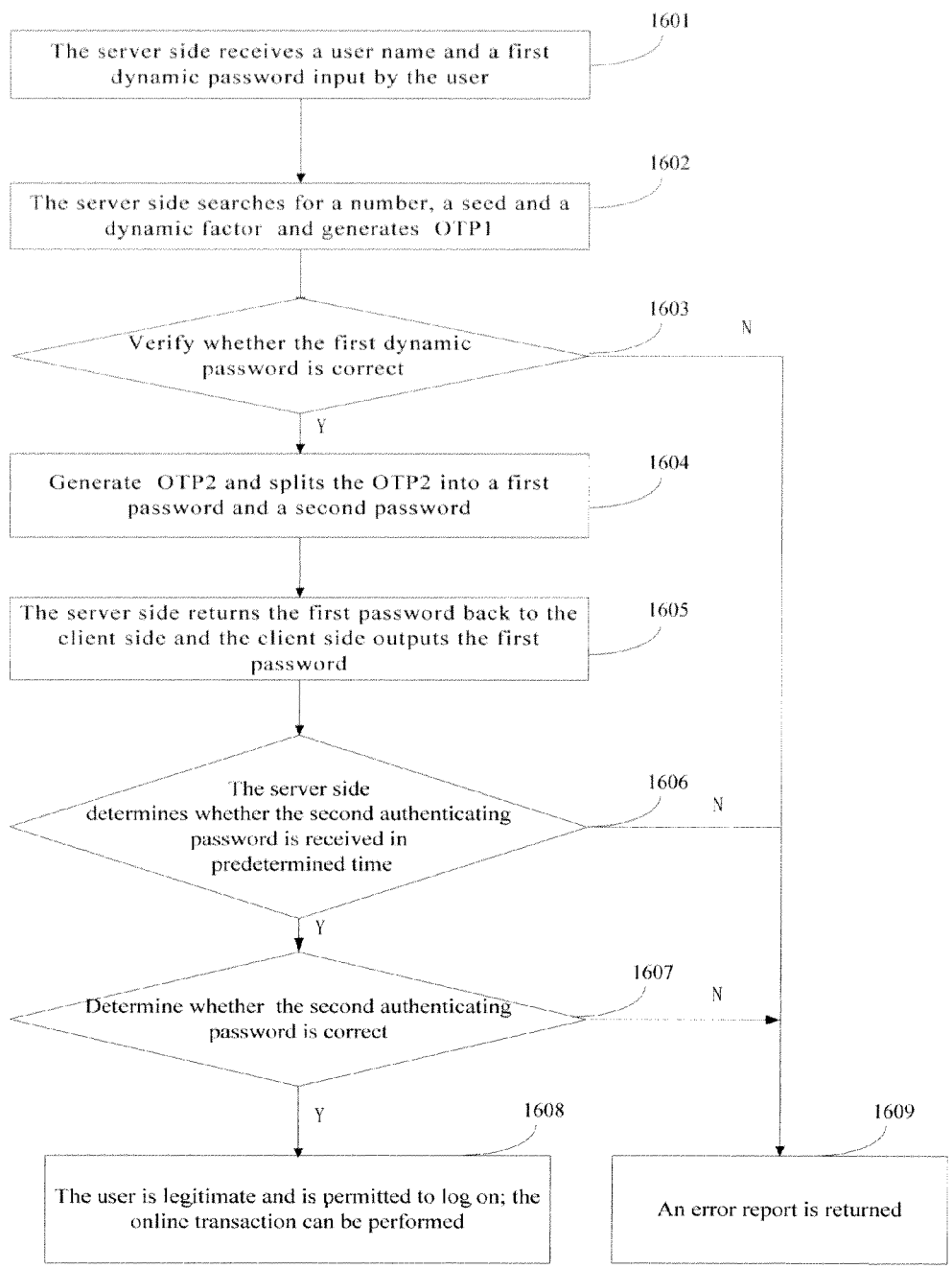
FIG. 16 is a flow chart illustrating a verification method on the basis of dynamic password provided by embodiment 13 of the invention.

The embodiment of the invention provides a method for verifying a dynamic password. By an example of logging on e-bank via dynamic password verification, the embodiment of the invention gives detailed illustration of verifying a dynamic password at a server side in the process of logging on e-bank by a user. Thereby, an example of counting times used in generating a dynamic password is taken in the embodiment of the invention. Referring to FIG. 16, the method includes:

Step 1601, the server side receives a user name and a first dynamic password which are input by the user;

In the embodiment of the invention, before starting the logon and verification process, a dynamic password token held by the user has been bonded with the user name of the user; the dynamic password token has a unique number and a unique seed corresponding to the number is stored in the server side; the dynamic password token can generate a dynamic password according to an inbuilt dynamic password algorithm; the dynamic password algorithm is identical to the algorithm for generating the dynamic password at the server side;

In the embodiment of the invention, the dynamic password token is arranged with a press button. A dynamic password generated by the user by pressing the press button for the first time is the first dynamic password;

The user inputs the user name and the first dynamic password into the client side and the client side sends the user name and the first dynamic password to the server side;

When a dynamic password is generated, a dynamic factor can be chosen to be based on time or event. In the embodiment of the invention, the dynamic password is generated based on time.

Step 1602, the server side searches for a number, a seed and a dynamic factor of the dynamic password token and generates a first authenticating dynamic password OTP1;

Thereby, the algorithm for the server side to generate OTP1 is identical to the algorithm for the dynamic password token to generate the first dynamic password; the dynamic passwords are generated with same algorithms and based on counting time; thereby, the algorithm can be HMAC-SHA1, MD5, SHA-1 or SHA-2, etc.

Step 1603, the server side verifies whether the first dynamic password is correct; if yes, go to step 1604; if no go step 1609;

Thereby, in Step 1602, the server side can generate one dynamic password or a set of dynamic passwords as OTP1; that is, OTP1 can be a set of dynamic passwords;

Specifically, that the server side verifies whether the first dynamic password is correct includes that when OTP1 is one dynamic password, the server side compares the first dynamic password with OTP1; if they are identical, the first dynamic password is regarded to be correct; if they are not identical, the first dynamic password is regarded to be incorrect;

when OTP1 is a set of dynamic passwords, the dynamic factor (count time) used for generating the set of dynamic passwords is a time window (the implement method will be described later in details); the server side compares the first dynamic password with every dynamic password in the set of dynamic passwords respectively; when one dynamic password in the OTP1 is identical to the first dynamic password, the comparison is regarded to be correct and the first dynamic password is correct; if none of the dynamic passwords in OTP1 is correct with the first dynamic password, the verification is regarded to be failed and the first dynamic password is incorrect;

Before the server side verifies whether the first dynamic password is correct, the method further includes that the server side determines whether the first dynamic password has been used; if the first dynamic password has not been used, the server side verifies whether the first dynamic password is correct; if the first dynamic password has been used, error report is returned back to the user;

When the server side verifies that the first dynamic password is correct, the method can further include aligning a dynamic factor stored at the server side (e.g. updating dynamic factor). The following is an example of generating a dynamic password by using counting time in the embodiment of the invention and the process of aligning the dynamic factor.

The dynamic password is generated based on counting time, that is, the time of generating the dynamic password by a device (the dynamic password token or the server side) is used as dynamic factor when the dynamic password is generated. For example, the time unit of 1 minute is used as the dynamic factor for generating the dynamic password in the embodiment of the invention. Generally, the dynamic password token sets an initial time at the time of initializing, for example, 00:00 (hour:minute) on Jan. 1, 2000; when a dynamic password is generated at 01:00 (hour:minute) on Jan. 1, 2000, the dynamic password token or the server side gets 60 minutes by 01:00 (hour:minute) on Jan. 1, 2000 minus the initial time of 00:00 (hour:minute) on Jan. 1, 2000 and 60 minutes is used as the dynamic factor for generating a dynamic password. Because the dynamic password token and the authentication server count time respectively, asynchrony happens often in counting time. Therefore the time factor needs to be aligned. The method for aligning the time factor is as the following:

For example, if the initial time of the dynamic password token and the authentication server is 00:00 (hour:minute) on Jan. 1, year 2000 and the time for generating a dynamic password is 01:00 (hour:minute) on Jan. 1, 2000, the dynamic factor used by the dynamic password token is 60 at that time. However, when the server side generates OTP1, the base time of the server side is 01:02 (hour:minute) on Jan. 1, 2000 because the error of counting time and data transfer, that is, the dynamic factor should be 62. When the server side generates a dynamic password, a floating range of time is set for the dynamic factor, for example, ±2 minutes. The floating range is called time window in the embodiment of the invention and a set of at most 7 OTP1s is generated based on 62±3. That is, the factors used by the server side are 59, 60, 61, 62, 63, 64 and 65. The OTP1s are compared with the first dynamic password one by one. When the OTP1 generated by using the first dynamic factor 59 is failed after comparison, another OTP1 generated by using the next dynamic factor 60 is compared with the first dynamic password. In the embodiment of the invention, when the dynamic factor is 60, the first dynamic password is verified to be correct; therefore a correct dynamic factor is obtained and the dynamic factor is updated to be 60; a counting time offset between the server side and the dynamic password token can be further calculated out, e.g. 2 minutes. For calculating a dynamic password next time adding the offset value to the obtained system time of the server side so as to get and use the time which is synchronous with the time of the dynamic password token as the a base time. Thereby, the base time equals to the sum of the system time of the server side and the counting time offset; the equal time can become the counting time after the synchronization with the time of the dynamic password token.

It should be noted that, when a dynamic password is generated by using counting time, every minute can be used as a dynamic factor for calculating dynamic password, or the dynamic password can be calculated by using a unit such as 30 seconds or 1 second. In specific application, the regulation of the time unit of the dynamic factor can be determined by the security and the calculation precision.

Step 1604, the server side generates the second authenticating dynamic password OTP2 and splits the OTP2 into a first password and a second password;

In the embodiment of the invention, because the dynamic factor is aligned in the step 1603, the second authenticating dynamic password OTP2 generated by the server side is one dynamic password.

That the server side splits OTP2 into a first password and a second password specifically includes that the server side takes a predetermined part in OTP2 as the first password and takes the rest part as the second password;

In the embodiment of the invention, preferably, OTP is a number with 8 digits. The first three digits are taken out as the first password and the last 5 digits are taken as the second password;

When the server side generates OTP2, it should be noted that OTP2 should not be identical to OTP1 so as to avoid the security vulnerability caused by that the OTP2 and OTP2 are identical because the time of generating OTP2 is too close to the time of generating OTP1. If the generating time of them above is too close, OTP2 can be generated by adding a step size to the time factor so as to avoid that OTP2 and OTP1 are identical.

Thereby, in order to avoid failed verification caused by network delay that the server side returns the first password back to the client side in the next step, that the server side generates OTP2 further includes a method that the dynamic password OTP2 generated by the server side is a set of passwords. For example, in step 1603, after the dynamic factor is aligned, the time offset is determined to be −2 minutes. The time of generating OTP2 equals to the synchronized time of server side add a step size, e.g. 01:00(hour:minute), Jan. 1, 2000 plus 1 minute, and the dynamic factor should is 61. In order to generate a set of dynamic passwords, a time window of +5 is added. That is, 6 OTP2s are generated by using 61, 62, 63, 64, 65 and 66.

If a set of 6 OTP2s are generated according to the above method, each OTP2 of the 6 OTP2s should be split into a first password and a second password so as to get 6 sets of first passwords and second passwords. The way of splitting is identical to the splitting method described above; no more detail is given here.

Step 1605, the server side returns the first password back to the client side and the client side outputs the first password;

Upon receiving OTP2, the client side uses the dynamic password token to generate the second dynamic password; the user divided the second dynamic password into a first authenticating password and a second authenticating password. The rule of dividing in the embodiment of the invention is identical to the splitting rule of the server side in step 1604 and the rule is predetermined by the server side and the user; therefore, the user of the embodiment of the invention takes the first three digits in the second dynamic password as the first authenticating password and takes the rest five digits as the second authenticating password;

The user compares the first password with the first authenticating password, if they are identical, the comparison is regarded to be successful and the second authenticating password is sent to the server side; if they are not identical, the comparison is regarded to be failed and the user can regard that the server side is illegitimate and stops logging on;

Thereby, it should be noted that, if the dynamic password is generated by using counting time (a time factor is used as the dynamic factor), the user uses the dynamic password token to generate a second dynamic password in regulated time upon receiving the first password sent by the server side. The reason is as the following:

The dynamic password token and the server side count time respectively. In the process of verification, OTP2 generated by the server side is earlier than the second dynamic password generated by the dynamic password token, therefore the time factor for generating OTP2 by the server side is different from the time factor for generating the second dynamic password by the dynamic password token such that the dynamic passwords are different. The method for improvement as the following should be used. After successful comparing the first dynamic password, the time is aligned so as to make time of the dynamic password token to be synchronized with the time of the server side; the aligned time is used as base time and a time interval, for example, 1 minute is set; the time got by adding one minute to the base time is used as time factor to generate dynamic password OTP2; OTP2 is one dynamic password and the dynamic passwords which are generated in the minute are identical. The server side splits the generated OTP2 into a first password and a second password and returns the first password back to the user; the user uses the dynamic password token to generate a second dynamic password in regulated time; the regulated time is less than 1 minute and the second dynamic password generated by the dynamic password token should be identical to OTP2.

In addition, the step can be performed in the following way: the server side generates an OTP2 at regular time interval and sends a first password which is obtained by splitting the OTP2 to the user. The following is an example of 1 minute as the regular time interval:

when the authentication server receives the first dynamic password and verifies that the first dynamic password is correct, the time is set to be 00:00(hour:minute) and the OTP2 is generated at that time. Preferably, in order to avoid that the first OTP2 is identical to the first dynamic password generated by the dynamic password token used by the user because the generating time of them is too close;

When the server side generates the first OTP2, the server side uses the next minute of the current time as the dynamic factor to generated a first one of OTP2; since then an OTP2 is generated at every minute; the first password obtained by splitting OTP2 is sent to the user so as to prevent that the user from delay of receiving or verifying the user. Thereby, dynamic passwords generated by the server side and the dynamic password token in same minute are identical; the second at the middle of a minute can be used as the dynamic factor or a second in a minute can be used as the dynamic factor. When a first password is returned, the times for returning the first password by the server side needs to be limited, e.g. a maximum times of return should be set; for example, if a first password is returned 10 times and the user performs no operation, the user is informed that the time is out and the verification is failed;

Thereby, the regular time interval can be longer than 0 and should be in a safe range;

When the server side generate a set of dynamic passwords in step 1604, the server side sends a plurality of first passwords obtained by splitting to the client side; then the user compares the first authenticating password with the plurality of first passwords, if one of the first password is identical to the first authenticating password, the client side returns the second authenticating password back to the server side.

Step 1606, the server side determines whether the second authenticating password is received in predetermined time, if yes, go to step 1607; otherwise, go to step 1609;

In the embodiment of the invention, the determined time is the valid time for the server side to receive the second authenticating password; the server side verifies the second authenticating password which is received in valid time and discards the second authenticating password which is not sent in the predetermined time so as to do not verify the second authenticating password. To some extent, the limitation of time can prevent an attack from a hacker.

Step 1607, the server side verities the second authenticating password, if the second authenticating password is correct, go to step 1608; otherwise, go to step 1609;

In the embodiment of the invention, that the server side verities the second authenticating password is that the server side compares the second password with the second authenticating password, if they are identical, the comparison is regarded to be successful, go to step 1608; if they are not identical, the comparison is failed, go to step 1609;

When the server side generates a set of multiple second authenticating dynamic passwords and splitting the second authenticating dynamic passwords to get a plurality of second passwords, that the server side verities the second authenticating password specifically is that the server side compares the plurality of second passwords with the second authenticating password, if one of the second passwords is identical to the second authentication password, the verification is regarded to be success;

In the embodiment of the invention, a process of verifying a static password can be added to prevent the illegitimate user from logging on caused by loss of the dynamic password token or the dynamic password token being stolen, which makes the process of logon to be safer. Specifically, the server side receives the second authenticating password and the static password sent by the user in a predetermined time and verifies the static password and the second authenticating password respectively, if both of them are correct, go to step 1608; otherwise go to step 1609.

Step 1608, the user is legitimate and is permitted to log on; the online transaction can be started;

Step 1609, an error report is returned;

In the embodiment of the invention, the case for returning an error report is same is identical to that of the embodiment 12 of the invention and no more detail is given here.

In the embodiment of the invention, the algorithms for generated a dynamic password can be the following; HMAC-SHA1, MD5, SHA-1 or SHA-2. Thereby, the algorithm of generating OTP1 by the server side and the algorithm of generating the first dynamic password by the dynamic token are identical; the algorithm of generating OTP2 by the server side is identical to the algorithm of generating the second dynamic password by the dynamic password token.

The server side of the embodiment of the invention generates a dynamic factor by using counting time and generates a dynamic password based on the dynamic factor; by splitting the generated dynamic password to get two passwords, the server side sends one password to the user for the user to verify whether the server side is legitimate and uses the other password to verify whether the user is legitimate, which prevents a malicious website such as a phishing website intercepted the user password from logging on and guarantees the information security of the user. By improving the server side, the method provided by the embodiment of the invention makes a common dynamic password token to be applicable as well; the user can use the dynamic password token to verify the legitimacy of the server side, which prevents the user from logging on the phishing website by mistake and loss and the security of the dynamic password is enhanced.

Embodiment 14

Figure 17:
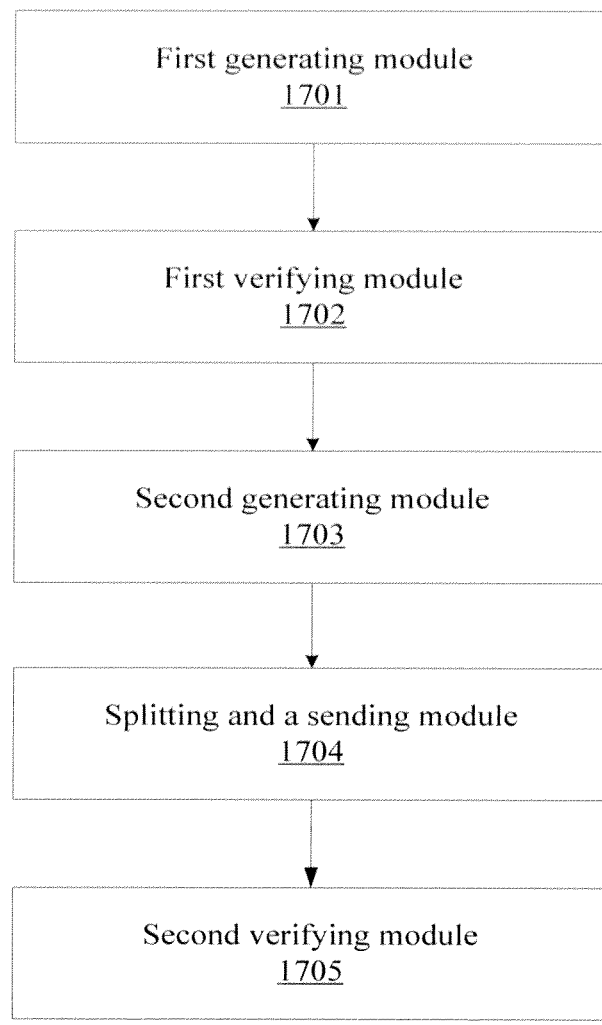
FIG. 17 is structure block diagram illustrating a verification method on the basis of dynamic password provided by embodiment 14 of the invention.

The embodiment of the invention provides a verifying device based on dynamic password. Referring to FIG. 17, the device includes a first generating module 1701 for receiving a user name and a first dynamic password sent by a user, searching for a seed and a dynamic factor which are corresponding to the user name and generating a first authenticating dynamic password according to the seed and the dynamic factor;

a first verifying module 1702 for verifying the first dynamic password by using a first authenticating dynamic password generated by the first generating module 1701;

a second generating module 1703 for generating the second authenticating dynamic password after the first dynamic password passing the verification of the first verifying module 1702;

a splitting and a sending module 1704 for splitting the second authenticating dynamic password generated by the second generating module 1703 into a first password and a second password and returns the first password hack to the user;

a second verifying module 1705 for, upon receiving the second authenticating password returned from the user in a predetermined time, using the second password got by splitting by the splitting and sending module 1704 to verify the second authenticating password, if the verification is successful, the user is determined to be legitimate.

Preferably, the device further includes a third verifying module for receiving a static password sent by the user and verities whether the static password is correct, triggering the second verifying module 1705 to verify the second authenticating password if the static password is correct or refusing the user to log on if the static password is not correct.

Thereby, the verifying device in the embodiment of the invention interacts with the user via the client side. The verifying device can be the server side of the Embodiment 11, 12 or 13 of the invention. The verifying device is pre-stored with a user name, a number of a dynamic password token, a seed and a dynamic factor which are corresponding to the user name and an algorithm for generating a dynamic password and a splitting rule for splitting a generated dynamic password into two passwords. The information above can reference the corresponding information in Embodiment 12 of the invention or Embodiment 13 of the invention and no more detail is given here.

The first authenticating dynamic password generated by the first generating module 1701 can be one dynamic password or a set of dynamic passwords; when the first authenticating dynamic password is one dynamic password, that the first verifying module 1702 verifies the first dynamic password specifically is that the first verifying module 1702 compares the first dynamic password with the dynamic password generated by the first generating module 1701; if they are identical, the verification is success, if they are not identical, the first dynamic password is verified to be incorrect;

When the first generating module 1701 generates a set of dynamic passwords, that the first verifying module 1702 verifies the first dynamic password specifically is that the first verifying module 1702 compares the first dynamic password with the set of the dynamic passwords generated by the first generating module 1701 one by one; if one of the dynamic passwords is identical to the first dynamic password, the comparison is regarded to be successful and the first dynamic password is verified to be correct; otherwise the first dynamic password is incorrect;

Before the first verifying module 1702 generates the first authenticating dynamic password, it further includes that the first verifying module 1702 determines whether the first dynamic password has been used; if the first dynamic password has not been used, the first verifying module 1702 verifies whether the first dynamic password is correct; if the first dynamic password has been used, the first verifying module 1702 returns an error report to the user, After that the first verifying module 1702 verifies that the first dynamic password is correct, it can include aligning the dynamic factor. The method of aligning the dynamic factor is identical to the method described in the Embodiment 12 of the invention or the Embodiment 13 of the invention and no more detail is given here.

The algorithm for the first generating module 1701 to generate the first authenticating dynamic password and the algorithm for the second generating module 1703 to generate the second authenticating dynamic password can be HMAC-SHA1, MD5, SHA-1 or SHA-2, etc.

The second generating module 1703 further can include generating a set of multiple second authenticating dynamic passwords after the first authenticating module 1702 verifies the first dynamic password successfully;

When the second generating 1703 generates a set of multiple second authenticating dynamic passwords, that the splitting and sending module 1704 splits the second authenticating dynamic password into a first password and a second password according the predetermined rule specifically is that the splitting and sending module 1704 splits the set of plurality of second authenticating dynamic passwords into a plurality of first passwords and a plurality of second passwords;

When the second generating module 1703 generates a set of plurality of second authenticating dynamic passwords, specifically, that the second verifying module 1705 verifies the second authenticating password includes that the second verifying module 1705 uses the plurality of second passwords to compare with the second authenticating password, when one of the second passwords is identical to the second authenticating password, the verification is regarded to be successful.

In the embodiment of the invention, the verifying device splits the generated dynamic password into two passwords, sends one password to the user for the user to verify whether the authenticating device is legitimate and uses the other password to verify whether the user is legitimate, which prevents a malicious website such as a phishing website from logging on with an intercepted user password so as to enhance the security of the system and ensures the safety of the user information.

From what is described above, the embodiment of the invention of the invention realizes the following technical effect.

By splitting the a dynamic password into two passwords, the server side and the user can perform mutual verification with enhanced security. With more reliability, the verification prevents an attack of a malicious website effectively and prevents an illegitimate user from logging on the server side with intercepted user information.

It should be noted that the steps shown in the flow chart of the drawings can be executed in a computer with a set of computer executable instructions. In addition, though logic sequence is shown in the flow chart, in some cases, steps can be executed in a sequence which is different from the sequence shown in the flow chart.

From the embodiment of the invention described above, those skilled in the art should know that the invention can be realized in form of software and necessary general hardware or, of course, by in form of hardware. In most cases, the former form is preferable. Based on such understanding, the essential part or the part which contribute to the prior art of the technical solution of the invention can be realized in form of software products. The software product of a computer is stored in storage medium, such as a floppy disk, a hard disk or a compressed disk, which includes a plurality of instructions used for a computer device (e.g. a personal computer, a server or network device, etc.) to execute the methods described by all embodiments of the invention.

The presently disclosed embodiments of the invention should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A verification method, comprising
receiving, by a server side, user data information and a first dynamic password sent by a user side;
generating, by the server side, a first authenticating dynamic password according to the user data information;
verifying, by the server side, the first dynamic password according to the first authenticating dynamic password and generating a second authenticating dynamic password after the first authenticating dynamic password passes verification;
sending, by the server side, the second authenticating dynamic password or a first password to the user side, wherein the first password is obtained by that the server side splitting the second authenticating dynamic password into the first password and a second password according to a predetermined rule,
for sending, by the server side, the second authenticating dynamic password to the user side,
if receiving, by the server side, a third dynamic password from the user side in a predetermined time, verifying a third dynamic password; the user side is legitimate if the third dynamic password passes verification;

or decrypting, by the server side, received cipher information from the user side to obtain plain information, and determining whether the plain information is in accordance with transaction information which is included in the user data information, wherein if yes, executing transaction, and the cipher information is obtained by encrypting the transaction information with the third dynamic password after the received second authenticating dynamic password passes verification;

for sending, by the server side, the first password to the user side, receiving, by the server side, a second dynamic password returned from the user side in a predetermined time, and verifying the second dynamic password by using the second password, wherein the user is legitimate if the second dynamic password passes verification; or decrypting, by the server side, the cipher information from the user side by using the second password to obtain plain information, and determining whether the plain information is in accordance with the transaction information which is included in the user data information, wherein if yes, executing transaction, and the cipher information is obtained by encrypting the transaction information with a third password, and wherein after the user side receives the confirmation information that the user confirms that the first password is in accordance with corresponding data in the second dynamic password generated by the user side, the user side uses the rest part of the data in the second dynamic password as the third password, wherein generating the second authenticating dynamic password comprises:

updating dynamic factor; and generating the second authenticating dynamic password by using the updated dynamic factor wherein generating the second authenticating dynamic password comprises:

generating the second authenticating dynamic password based on time or event, wherein when generating the second authenticating dynamic password based on event, updating the dynamic factor comprises setting the dynamic factor to be a first dynamic factor used by the user side for generating the first dynamic password, in which the first dynamic factor is a count value when generating the first dynamic password by the user side;

adding a predetermined step size to the dynamic factor so as to be used as an updated dynamic factor;

when generating the second authenticating dynamic factor based on time, the updating the dynamic factor includes setting the dynamic factor to be a first dynamic factor used by the user side for generating a first dynamic factor, in which the first dynamic factor is a difference between a counting time when generating the first dynamic password by the user side and an initial time preset by the user side;

updating counting time offset according to the dynamic factor, in which the counting time offset is a difference between the current counting time of an entity which generates the second authenticating dynamic password and the current counting time of the user side;

the updated dynamic factor is generated according to the counting time offset, the counting time of the entity which generates the second authenticating dynamic password and the preset initial time of the entity.

2. The method according to claim 1, wherein, sending, by the server side, the first password to the user side comprises:

sending, by the server side, the first password and the transaction information to the user side.

3. The method according to claim 1, wherein after sending, by the server side, the second authenticating password or the first password to the user side, the method further comprises:

for sending, by the server side, the second authenticating password to the user side, verifying, by the user side, the received second authenticating dynamic password; and sending the third dynamic password if the second authenticating dynamic password is verified to be correct;

for sending, by the server side, the first password to the user side, outputting, by the user side, the first password for the user to confirm; receiving, by the user side, the second authenticating password sent from the user after the user verifies that the first password is correct by comparison and sending the second authenticating password to the server side.

4. The method according to claim 1, wherein when the second authenticating dynamic password is generated based on time, sending, by the server side, the second authenticating dynamic password to the user side comprises generating a dynamic password at regular time intervals, and using the generated dynamic password as the second authenticating dynamic password and sending the second authenticating dynamic password to the user side so as to verify the currently sent second authenticating dynamic password.

5. The method according to claim 1, wherein verifying the first dynamic password comprises:

generating the first authenticating dynamic password;

determining whether the first dynamic password is identical to the first authenticating dynamic password, wherein if yes, the first dynamic password is correct; or verifying the first dynamic password comprises:

generating a first set of authenticating dynamic passwords;

determining whether an authenticating dynamic password in the first set of authenticating dynamic passwords is identical to the first dynamic password, wherein if yes, the first dynamic password is correct.

6. The method according to claim 1, further comprising: when receiving, by the server side, a third dynamic password sent from the user side in a predetermined time, further receiving a static password from the user side in the predetermined time so as to determine that the user logs on successfully in the case that both the third dynamic password and the static password are verified to be correct, or before verifying, by the server side, the second authenticating password with the second password, receiving, by the server side, the static password input by the user;

verifying whether the static password is correct, wherein if yes, executing the step of verifying the second dynamic password with the second password; otherwise, refusing the user to log on.

7. The method according to claim, wherein, generating the second authenticating dynamic password based on time specifically comprises generating, by the server side, a set of multiple second authenticating dynamic passwords, sending, by the server side, a set of multiple second authenticating dynamic passwords or a set of multiple first passwords to the user side, in which the set of multiple first passwords is obtained by splitting, by the server side, the set of multiple second authenticating dynamic passwords into multiple first passwords and multiple second passwords according a predetermined rule.

8. The method according to claim 1, wherein after receiving, by the server side, user data information and the first dynamic password sent by the user side further comprises:
determining, by the server side, whether the first dynamic password has been used, wherein if yes, returning an error report to the user; otherwise, executing the step of generating, by the server side, the first authenticating dynamic password according to the user data information.

9. The method according to claim 1, wherein splitting the second authenticating dynamic password into a first password and a second password according to a predetermined rule specifically comprises:
extracting a predetermined part from the second authenticating dynamic password as the first password and using the rest part of the second authenticating dynamic password as the second password.

10. The method according to claim 1, further comprising discarding, by the server side, the third dynamic password or the second dynamic password which is received from the user side after the predetermined time.

11. A verification system, comprising a server side and a user side, in which the server side comprises:
a receiving module configured for receiving user data information and a first dynamic password from the user side;
a generating module or a generating and splitting module, in which the generating module is configured for generating a second authenticating dynamic password after the server side verifies that the first dynamic password is correct by using a first authenticating dynamic password, and is further configured for generating a third authenticating dynamic password; the generating and splitting module is configured for generating a second authenticating dynamic password after the server side verifies that the first dynamic password is correct by using a first authenticating dynamic password and splitting the second authenticating dynamic password into a first password and a second password according to a predetermined rule;
a sending module configured for sending the second authenticating dynamic password or a first password to the user side; wherein
if the sending module is configured for sending the second authenticating dynamic password to the user side,
the receiving module is further configured for receiving a third password from the user side and the server side further comprises a verifying module configured for verifying the third password received by the receiving module from the user side, wherein if the verification is successful, the user side is legitimate; or
the receiving module is further configured for receiving encrypted cipher information from the user side, and the server side further comprises a decrypting module configured for decrypting the encrypted cipher information received from the user side to obtain plain information; a determining module configured for determining whether the plain information is in accordance with the transaction information; and an executing module configured for executing transaction after determining that the plain information is in accordance with the transaction information by the determining module;

if the sending module is configured for sending the first password to the user side,
the receiving module is further configured for receiving a second dynamic password returned by the user side, and the server side further comprises a verifying module for verifying the second dynamic password by using the second password, wherein if the verification is successful, the user is determined to be legitimate, or
the receiving module is further configured for receiving cipher information from a user side and the server side further comprises a decrypting module configured for decrypting encrypted cipher information received by the receiving module from the user side, in which the cipher information is obtained by encrypting the transaction information by the user side with a third password which is the rest part data of the second dynamic password after receiving a confirming information that the user determines that the first password is in accordance with a corresponding part data of the second dynamic password by comparison; a determining module configured for determining whether the plain information is in accordance with the transaction information; and an executing module configured for executing transaction after the determining module determines that the plain information is in accordance with the transaction information,
further comprising an updating module configured for updating a dynamic factor, and correspondingly, the generating module is further configured for generating the second authenticating dynamic password by using the updated dynamic factor,
wherein the generating module is configured for generating the second authenticating dynamic password based on time or event, and
when the generating module generates the second authenticating dynamic password based on time, the updating module is configured for setting the dynamic factor to be a first dynamic factor used by the user side for generating the first dynamic password, in which the first dynamic factor is a count value when generating the first dynamic password by the user side; adding a predetermined step size on the dynamic factor so as to be used as the updated dynamic factor;
when the generating module generates the second authenticating dynamic password based on time, the updating module is configured for:
setting the dynamic factor to be a first dynamic factor used by the user side for generating the first dynamic factor, in which the first dynamic factor is a difference between the counting time of generating the first dynamic password by the user side and the preset initial time of the user side;
updating counting time offset according to the dynamic factor, wherein the counting time offset is a difference between the current counting time of an entity which generates the second authenticating dynamic password and the current counting time of the user side;
generating an updated dynamic factor according to the counting time offset, the counting time which is used for generating the second authenticating dynamic password by the entity and the predetermined initial time of the entity.

12. The system according to claim 11, wherein the sending module being configured for sending the first password to the user side comprises the sending module being configured for sending the first password and the transaction information to the user side.

13. The system according to claim 11, wherein if the server side sends the second authenticating password to the user side, the user side comprises a verifying and sending module configured for verifying the second authenticating dynamic password received by the user side and sending the third dynamic password after verifying that the second authenticating password is correct; and if the server side sends the first password to the user side, the user side comprises:
an outputting module configured for the user side to output the first password for the user to confirm;
a comparing and sending module configured for receiving a second authenticating password sent from the user by the user side after the user side determines that the first password is correct after comparison by the user and sending the second authenticating password to the server side.

14. The system according to claim 11, wherein if the generating module generates the second authenticating dynamic password based on time, the sending module configured for sending the second authenticating dynamic password to the user side comprises a dynamic password being generated by the sending module at regular time intervals and sending the dynamic password as the second authenticating dynamic password to the user side so as to verify the current sent second authenticating dynamic password.

15. The system according to claim 11, wherein the server side further comprises a determining and executing module configured for, after the server side receiving the user information and the first dynamic password sent from the user side,
determining whether the first dynamic password has been used, and if yes, returning error report to the user side; if no, executing the step of generating, by the server side, a first authenticating dynamic password according to the user data information.

16. The method according to claim 11, wherein the generating and splitting module splits the second authenticating dynamic password into a first password and a second password according to a predetermined rule, and specifically, comprises extracting a predetermined part from the second authenticating dynamic password as the first password and using the rest part of the second authenticating dynamic password as the second password.

* * * * *